US012718313B2

(12) United States Patent
Malhotra et al.

(10) Patent No.: US 12,718,313 B2
(45) Date of Patent: Aug. 25, 2026

(54) STATE PROGRAMMING OVERHEAD REDUCTION

(71) Applicant: QUALCOMM Incorporated, San Diego, CA (US)

(72) Inventors: Geetika Malhotra, Bangalore (IN); Vishwanath Shashikant Nikam, Bangalore (IN); Sukumar Srikanth, Bengaluru (IN); Sushant Ganeshrao Ingle, Parbhani (IN); Kalyan Kumar Bhiravabhatla, Bengaluru (IN); Andrew Evan Gruber, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 18/618,409

(22) Filed: Mar. 27, 2024

(65) Prior Publication Data

US 2025/0307976 A1 Oct. 2, 2025

(51) Int. Cl.
*G06T 1/20* (2006.01)

(52) U.S. Cl.
CPC .................................... *G06T 1/20* (2013.01)

(58) Field of Classification Search
CPC ... G06T 1/20; G06F 2209/509; G06F 9/3877; G06F 9/505
USPC .......................... 345/501, 519, 522; 708/250
See application file for complete search history.

(56) References Cited

U.S. PATENT DOCUMENTS

2009/0210573 A1* 8/2009 Yudenfriend ........... G06F 13/12 710/19
2014/0184619 A1* 7/2014 Kim .......................... G06T 1/20 345/519
2015/0088950 A1* 3/2015 Stark ....................... G06F 7/584 708/250
2020/0012531 A1* 1/2020 Li ......................... G06F 9/5088
2020/0311859 A1* 10/2020 Du ............................ G06T 1/20
(Continued)

FOREIGN PATENT DOCUMENTS

WO 2023287540 A1 1/2023

OTHER PUBLICATIONS

International Search Report and Written Opinion—PCT/US2025/019850—ISA/EPO—Jun. 20, 2025.

*Primary Examiner* — Prabodh M Dharia
(74) *Attorney, Agent, or Firm* — Procopio, Cory, Hargreaves & Savitch LLP

(57) ABSTRACT

Systems, devices, apparatus, and methods, including computer programs encoded on storage media for reducing graphics processor overhead for associated workloads may, via a graphics processor, obtain a first indication of a first set of payload commands and a second indication of a second set of state commands. The first set of payload commands may be associated with a payload path. The second set of state commands may be associated with a state path. The graphics processor may determine that a state command in the second set of state commands is associated with a workload that is less than a threshold. The graphics processor may associate the state command with the payload path based on the determination. The graphics processor may output a third indication of the associated state command. The graphics processor may execute the state command in the payload path after the output of the third indication.

20 Claims, 13 Drawing Sheets

(56) References Cited

U.S. PATENT DOCUMENTS

| | | | | |
|---|---|---|---|---|
| 2021/0320794 | A1 * | 10/2021 | Auh | H04L 9/0836 |
| 2021/0383596 | A1 * | 12/2021 | Chan | G06T 15/205 |
| 2022/0292626 | A1 * | 9/2022 | Agostini | G06T 1/20 |
| 2023/0138635 | A1 * | 5/2023 | Chodor | G06F 8/41<br>345/501 |

* cited by examiner

802
CPU

804
GPU 806
graphics command(s)

808
determine state command(s) for payload path 810
associate state command(s) with payload path 812
output command(s) for payload path and command(s) for state path

STATE PROGRAMMING OVERHEAD REDUCTION

TECHNICAL FIELD

The present disclosure relates generally to processing systems, and more particularly, to one or more techniques for a graphics processing system.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current graphics processing techniques may not address optimization of GPU resources for separate hardware architecture paths. There is a need for improved graphics optimization techniques when assigning workloads to hardware architecture paths.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may have at least one memory and at least one processor coupled to at least one memory. Based at least in part on information stored in the at least one memory, the at least one processor, individually or in any combination, may be configured to obtain a first indication of a first set of payload commands and a second indication of a second set of state commands. The first set of payload commands may be associated with a payload path. The second set of state commands may be associated with a state path. The at least one processor, individually or in any combination, may be configured to determine that a state command in the second set of state commands is associated with a workload that is less than a threshold. The at least one processor, individually or in any combination, may be configured to associate the state command with the payload path based on the determination. The at least one processor, individually or in any combination, may be configured to output a third indication of the associated state command. The at least one processor, individually or in any combination, may be configured to execute the state command in the payload path after the output of the third indication.

In some aspects, the techniques described herein relate to a method of graphics processing, including: obtaining a first indication of a first set of payload commands and a second indication of a second set of state commands, where the first set of payload commands is associated with a payload path, and where the second set of state commands is associated with a state path; determining that a state command in the second set of state commands is associated with a workload that is less than or equal to a workload threshold; associating the state command with the payload path based on the determination; and outputting a third indication of the associated state command.

In some aspects, the techniques described herein relate to a method, further including: executing the state command in the payload path after the output of the third indication.

In some aspects, the techniques described herein relate to a method, further including: executing the first set of payload commands in the payload path; and executing a subset of the second set of state commands in the state path, where the subset of the second set of state commands does not include the state command.

In some aspects, the techniques described herein relate to a method, further including: determining that a portion of the state command is associated with a plurality of state commands of the second set of state commands; associating the plurality of state commands with the payload path; associating the portion of the state command with the plurality of state commands; and outputting a fourth indication of the association of the portion of the state command with the plurality of state commands.

In some aspects, the techniques described herein relate to a method, where the state command includes a configuration of a common resource (e.g., a common texture, a common constant buffer) associated with the plurality of state commands.

In some aspects, the techniques described herein relate to a method, further including: determining that a second portion of the state command is not associated with a subset of the plurality of state commands; determining that a third portion of a second state command of the plurality of state commands is associated with the subset of the plurality of state commands; associating the third portion of the second state command with the subset of the plurality of state commands; and outputting a fifth indication of the association of the third portion of the second state command with the subset of the plurality of state commands.

In some aspects, the techniques described herein relate to a method, where the third portion of the second state command includes a common constant buffer.

In some aspects, the techniques described herein relate to a method, where associating the portion of the state command with the plurality of state commands includes merging the portion of the state command and the plurality of state commands into a multi-payload state command associated with the payload path.

In some aspects, the techniques described herein relate to a method, where the multi-payload state command includes a plurality of draw calls.

In some aspects, the techniques described herein relate to a method, further including: executing the multi-payload state command in the payload path after the output of the fourth indication.

In some aspects, the techniques described herein relate to a method, where executing the multi-payload state command in the payload path includes: saving a fifth indication of the portion of the state command in the payload path; and executing each of the plurality of state commands using the payload path while the fifth indication is saved in the payload path.

In some aspects, the techniques described herein relate to a method, where the portion of the state command includes a common render state.

In some aspects, the techniques described herein relate to a method, where the first set of payload commands includes a set of draw calls.

In some aspects, the techniques described herein relate to a method, where outputting the third indication of the associated state command includes: transmitting the third indication of the associated state command; or storing the third indication of the associated state command.

In some aspects, the techniques described herein relate to a method, further including executing the state command in the payload path.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
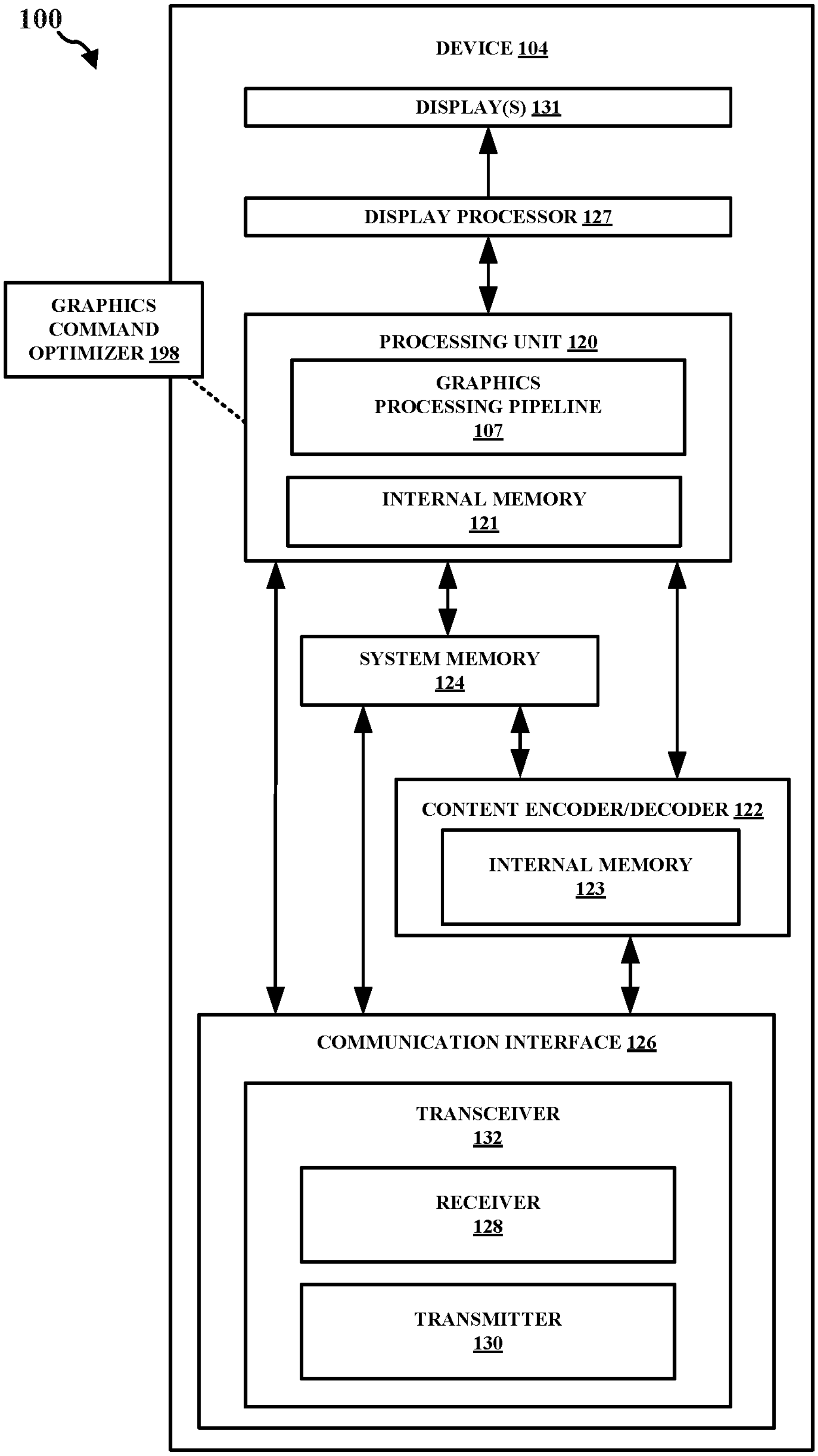
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

The following description is directed to examples for the purposes of describing innovative aspects of this disclosure. However, a person having ordinary skill in the art may recognize that the teachings herein may be applied in a multitude of ways. Some or all of the described examples may be implemented in any device or system that is capable of processing graphics commands. Various aspects relate generally to processing graphics commands for a graphics processing unit (GPU). Some aspects more specifically relate to processing graphics commands for a GPU hardware architecture having separate parallel paths, such as a payload path (e.g., for data processing) and a state path (e.g., for programming). A processing path (e.g., a payload path or a state path) may include a set of shader processor and fixed function blocks that process a graphics command. Thus, a payload path may include a set of shader processor and fixed function blocks that process data processing commands, or payload commands. A payload command may be commands that are associated, by default, with a payload path. Payload commands may include commands to draw elements for a rendered frame, for example draw calls, primitives, or pixels. Moreover, a state path may include a set of shader processor and fixed function blocks that process programming commands, or state commands. A state command may be graphics commands that are associated, by default, with a state path. State commands may include GPU configuration states, shade kernels, resources used in a shader, or constant buffers. In other words, state commands may include commands to regulate how graphics content will be processed, for example context register packets for a set of global state information, such as information regarding a global register, shading program, or constant data. A graphics command may be associated with the payload path or the state path for execution by the respective path.

In some examples, a graphics processor system may obtain a first indication of a first set of payload commands and a second indication of a second set of state commands. The first set of payload commands may be associated with a payload path. The second set of state commands may be associated with a state path. The graphics processor system may determine that a state command in the second set of state commands is associated with a workload that is less than a threshold. The graphics processor system may associate the state command with the payload path based on the determination. The graphics processor system may output a third indication of the associated state command. The graphics processor system may execute the state command in the payload path after the output of the third indication.

A command processor may bifurcate received commands into multiple processing paths. For example, a command processor may separate graphics commands into a set of payload commands associated with the payload path and a set of state commands associated with the state path. In one example, a set of draw calls may be bifurcated into a set of payload commands and a set of state commands. In other aspects, a driver of a GPU may bifurcate each received graphics command into a payload command and a draw command. A set of draw calls with small workloads (e.g., less than or equal to a workload threshold) bifurcated into a set of payload commands and a set of state commands may not utilize the full throughput capacity of the payload path when executing the payload commands and may consume more time in the programming path than the payload path time when executing the state commands. In some aspects, a graphics processor system may offload some of the state programming to the payload path, for example constants or textures. A driver of the graphics processor system may group multiple draw calls together, and may send the grouped graphics command as a single invocation to the GPU. In some aspects, when constant buffer views are updated, the methodology may be extended. Internally, the GPU hardware blocks may merge the sub-draws of the pseudo multi-draw invocation (i.e., the grouped draw calls) by maintaining the primitive order and handling constant buffer updates via the payload path. Multiple sets of indirect instanced-draws may be submitted in one application programming interface (API) call. In some aspects, such a multi-draw command may include a plurality of draw commands. Each draw command may be bifurcated into some work for the payload path (i.e., a payload command) and some configuration parameters for the state path (i.e., a state command). The GPU execution of the sub-draws inside the multi-draw may be optimized by sending at least some of the state programming of the draws via the payload path (i.e., reassigning the state commands, or some of the state commands, to the payload path). This may help reduce the workload executed by the programming path, which may have lower throughput capacity than the payload path of the GPU. By doing so, the sub-draws within a multi-draw may be unrolled beyond the draw call level boundary. This may help in reducing the scheduling overhead of the individual sub-draws and may optimize the small draw problem by moving state commands to the payload path. Multiple draws with no render state change may be brought together and processed as a single unit. Constant buffer updates may also be handled alongside draw call merging. To support this, shared constant register updates may be sent via the payload path of the GPU and the blocks (e.g., shader processor blocks, fixed function blocks) responsible for scheduling the shader processor may maintain primitive/pixel order alongside handling the respective constant buffer with one level of added indirection.

Particular aspects of the subject matter described in this disclosure can be implemented to realize one or more of the following potential advantages. In some examples, by offloading one or more state commands to the payload path, the described techniques can be used to reduce the processing time of executing graphics commands using a graphics processing system.

The examples describe herein may refer to a use and functionality of a graphics processing unit (GPU). As used herein, a GPU can be any type of graphics processor, and a graphics processor can be any type of processor that is designed or configured to process graphics content. For example, a graphics processor or GPU can be a specialized electronic circuit that is designed for processing graphics content. As an additional example, a graphics processor or GPU can be a general purpose processor that is configured to process graphics content.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples.

The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit may include a graphics command optimizer 198 configured to obtain a first indication of a first set of payload commands and a second indication of a second set of state commands. The first set of payload commands may be associated with a payload path. The second set of state commands may be associated with a state path. The graphics command optimizer 198 may be configured to determine that a state command in the second set of state commands is associated with a workload that is less than a threshold. The graphics command optimizer 198 may be configured to associate the state command with the payload path based on the determination. The graphics command optimizer 198 may be configured to output a third indication of the associated state command. The graphics command optimizer 198 may be configured to execute the state command in the payload path after the output of the third indication. Although the following description may be focused on graphics processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit or bits that indicate which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may change the corresponding context. Additionally, the workload that corresponds to the mode or state may follow the changing mode or state.

Figure 2:
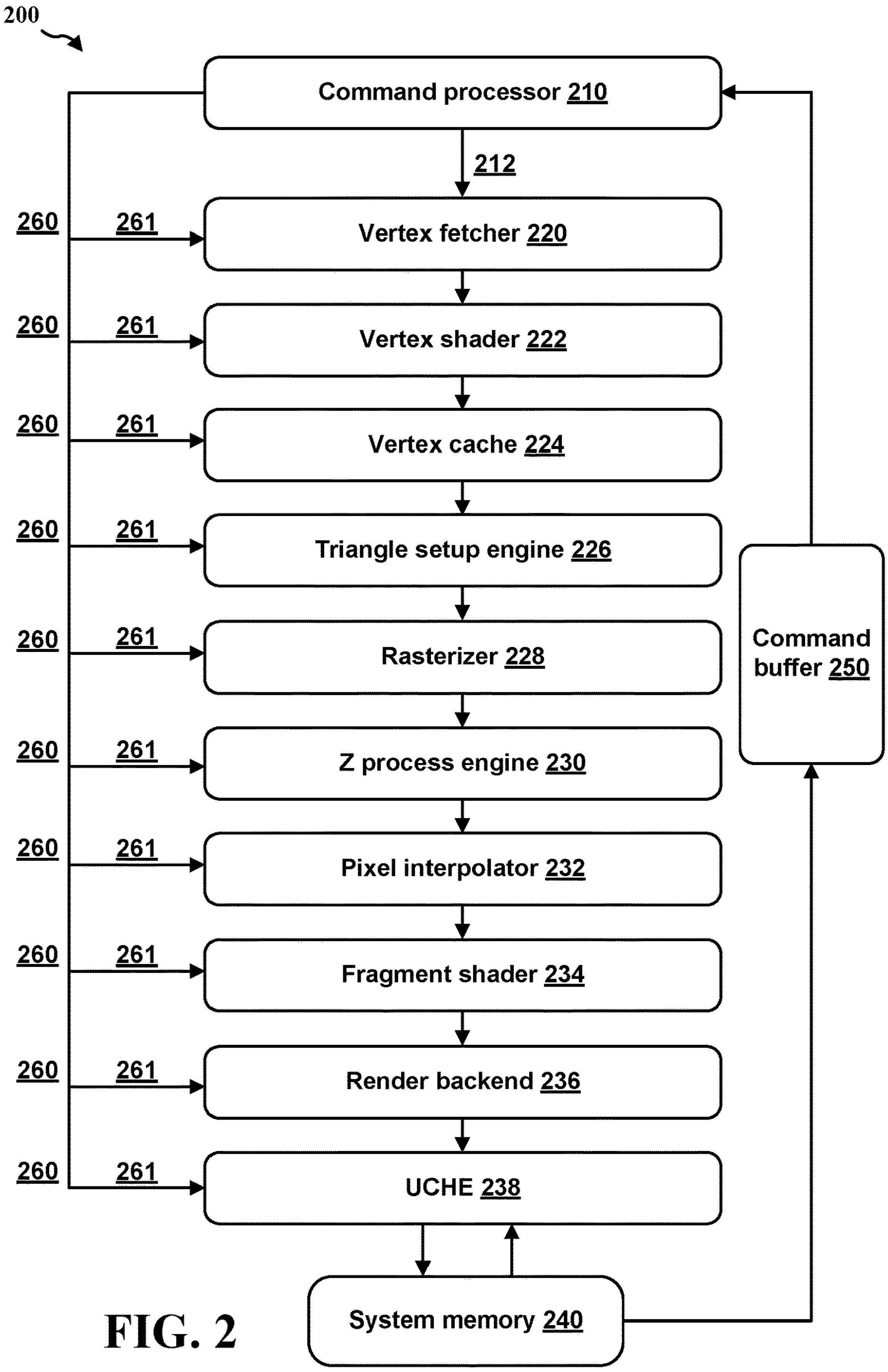
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 illustrates that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call packets 212 through separate paths to the processing units or blocks in the GPU. Further, the command buffer 250 can alternate different states of context registers and draw calls. For example, a command buffer can simultaneously store the following information: context register of context N, draw call(s) of context N, context register of context N+1, and draw call(s) of context N+1.

Figure 3:
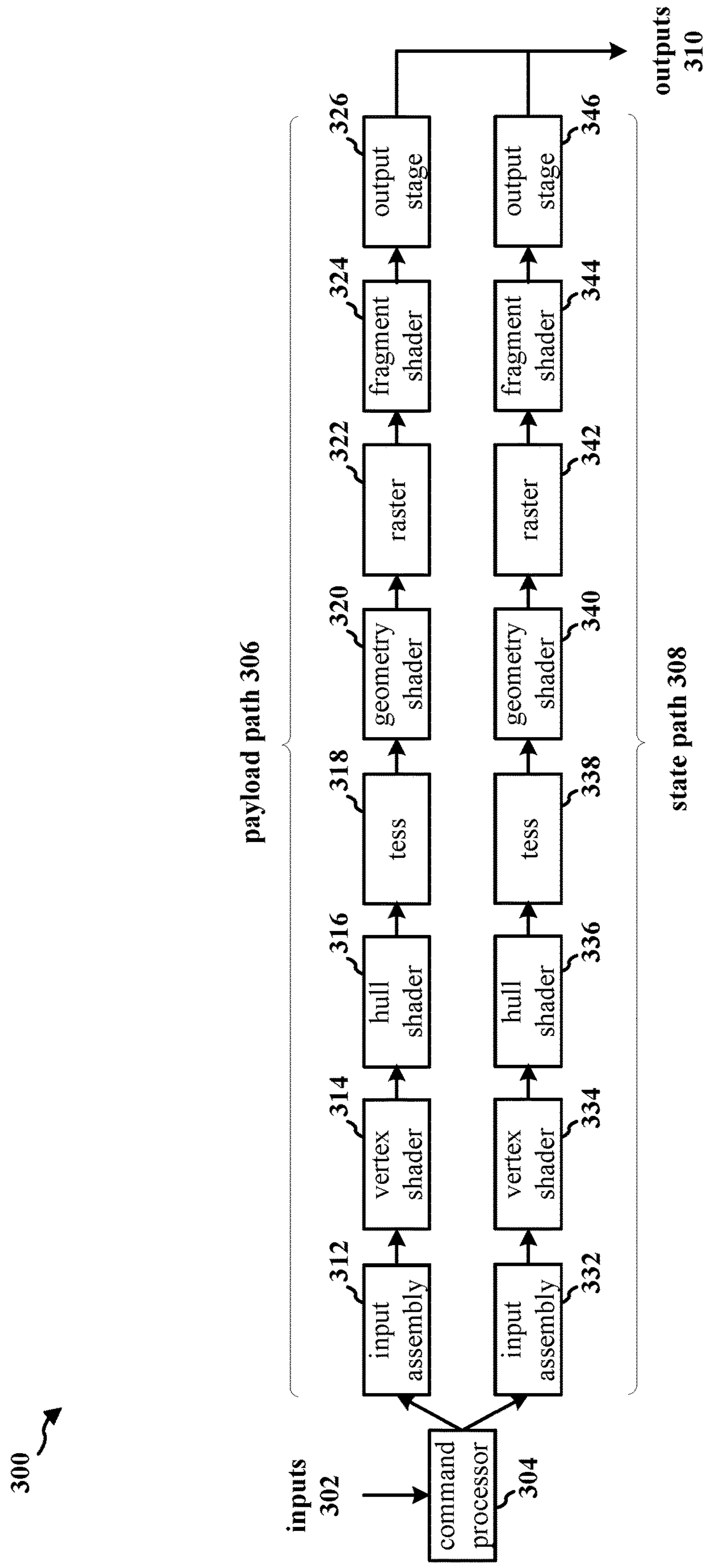
FIG. 3 illustrates another example GPU in accordance with one or more techniques of this disclosure.

FIG. 3 illustrates an example GPU 300 in accordance with one or more techniques of this disclosure. As shown in FIG. 3, GPU 300 includes CP 304 that accepts a set of inputs 302 and bifurcates commands (i.e., tasks) based on the set of inputs 302 to a payload path 306 and a state path 308 to produce a set of outputs 310. The set of outputs 310 may be output to a display or a display processor, such as the one or more displays 131 or the display processor 127 of FIG. 1. Each of the payload path 306 and the state path 308 may include a set of shader processor blocks and a set of fixed function blocks. For example, the payload path 306 may include an input assembly block 312, a vertex shader 314, a hull shader 316, a tessellator 318, a geometry shader 320, a raster 322, a fragment shader 324, and an output stage 326. The state path 308 may include an input assembly 332, a vertex shader 334, a hull shader 336, a tessellator 338, a geometry shader 340, a raster 342, a fragment shader 344, and an output stage 346. Although FIG. 3 illustrates that the payload path 306 may include the set of shader processor blocks and the set of fixed function blocks that include the input assembly block 312, the vertex shader 314, the hull shader 316, the tessellator 318, the geometry shader 320, the raster 322, the fragment shader 324, and the output stage 326, and illustrates that the state path 308 may include the set of shader processor blocks and the set of fixed function blocks that include the input assembly 332, the vertex shader 334, the hull shader 336, the tessellator 338, the geometry shader 340, the raster 342, the fragment shader 344, and the output stage 346, a path may include any number of additional processing units. Moreover, the processing units shown in FIG. 3 are shown as an example, and any combination or order of processing units can be used by GPUs according to the present disclosure.

As shown in FIG. 3, a GPU can utilize a CP, e.g., CP 304, or hardware accelerator, to parse a command buffer into payload commands (e.g., draw calls) and state commands (e.g., GPU configuration state, shader kernel, resources used in shader, texture, constant buffer). Payload commands may be commands that are associated, by default, with a payload path, such as draw calls. State commands may be graphics commands that are associated, by default, with a state path, such as a GPU configuration state, a shader kernel, resources used in a shader, a texture, or a constant buffer. A graphics command may be a command that is associated with graphics processing. A multi-payload payload command may be a command that is associated with multiple payloads. Each draw call may internally translate to multiple payload commands, as a draw call generally includes several primitives that generate multiple pixels. All the primitives and pixels may be associated, by default, with the payload path. Further, the CP 304 may alternate different states of context registers and draw calls. The throughput capacity of the payload path 306 may be higher than the throughput capacity of the state path 308. The payload path 306 and the state path 308 may be separate parallel paths for commands that are output by the CP 304.

GPUs can render images in a variety of different ways. In some instances, GPUs can render an image using direct rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects of tiled rendering, during a binning pass, an image can be divided into different bins or tiles. In some aspects, during the binning pass, a visibility stream can be constructed where visible primitives or draw calls can be identified. A rendering pass may be performed after the binning pass. In contrast to tiled rendering, direct rendering does not divide the frame into smaller bins or tiles. Rather, in direct rendering, the entire frame is rendered at a single time (i.e., without a binning pass). Additionally, some types of GPUs can allow for both tiled rendering and direct rendering (e.g., flex rendering).

In some aspects, GPUs can apply the drawing or rendering process to different bins or tiles. For instance, a GPU can render to one bin, and perform all the draws for the primitives or pixels in the bin. During the process of rendering to a bin, the render targets can be located in GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible so that the non-visible primitives are not rendered, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a binning, a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory and used to remove primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 4:
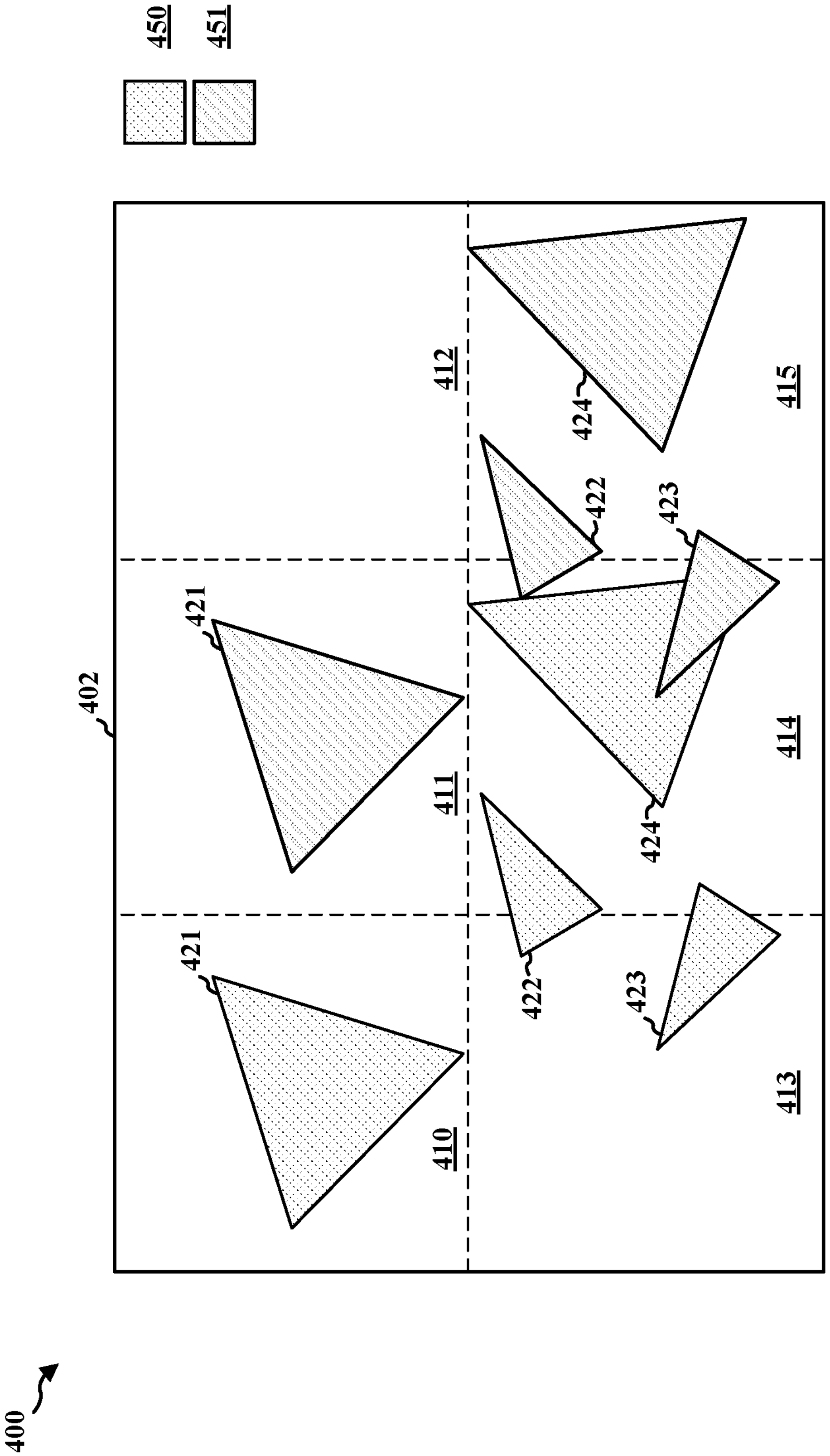
FIG. 4 illustrates an example image or surface in accordance with one or more techniques of this disclosure.

FIG. 4 illustrates image or surface 400, including multiple primitives divided into multiple bins in accordance with one or more techniques of this disclosure. As shown in FIG. 4, image or surface 400 includes area 402, which includes primitives 421, 422, 423, and 424. The primitives 421, 422, 423, and 424 are divided or placed into different bins, e.g., bins 410, 411, 412, 413, 414, and 415. FIG. 4 illustrates an example of tiled rendering using multiple viewpoints for the primitives 421-324. For instance, primitives 421-424 are in first viewpoint 450 and second viewpoint 451. As such, the GPU processing or rendering the image or surface 400 including area 402 can utilize multiple viewpoints or multi-view rendering.

As indicated herein, GPUs or graphics processors can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, where, as discussed above, a surface is divided into multiple bins or tiles and then each bin or tile can be separately rendered. Further, in tiled rendering, the frame buffer can be partitioned into multiple bins or tiles.

As indicated herein, in some aspects, such as in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GMEM at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In some aspects, such as in bin or tiled rendering, a small portion of the memory can be stored at the GPU, e.g., at the GMEM. In some instances, storing data at the GMEM may utilize a larger processing workload and/or consume more power compared to storing data at the frame buffer or system memory.

A GPU may be used in a mobile device, for example a user equipment (UE) or a wireless mobile phone device. Interactive games with high-definition content may inspire a greater desire for performance gains and power reductions for executing graphics commands on such mobile devices. Increasing GPU utilization may help in exercising parallelism, thereby improving performance. Referring back to FIG. 3, a GPU may execute graphics commands using parallel paths, such as the payload path 306 and the state path 308. In some aspects, as payload commands (e.g., draw calls) are amplified (e.g., a draw command results in drawing multiple triangles and pixels) in the GPU at multiple stages, the throughput capacity of the payload path 306 may be higher than the throughput capacity of the state path 308.

In some aspects, a set of graphics commands may include a set of small workloads to process (e.g., a workload is less than or equal to a workload threshold). Different hardware architectures may have different workload threshold values. For example, one hardware architecture may have a workload threshold of less than 32 triangles, while another hardware architecture may have a workload threshold of less than 128 triangles. Such small workload draws may be common in embodiments where a process may fill a scene one object at a time. For example, a process may render a rocky terrain which has small, medium, and large sized rocks with varying vertex counts and level of details (LODs). The process may render each of the rocks one by one by scheduling individual render application programming interfaces (APIs)—for example by creating one large vertex buffer (i.e., a vertex buffer greater or equal to a vertex buffer threshold) and a constant buffer that holds offset information and/or transform information. A workload may be quantified as a total number of primitives and pixels associated with a draw call that is processed on a payload path, such as the payload path 306. A workload threshold may be expressed as a number of triangles.

Draw calls with a small workload to process may not have payload commands that utilize the full throughput capacity of the payload path 306. A small workload may be defined as any workload of a draw call that is less than or equal to a workload threshold (e.g., 128 triangles). Moreover, the corollary state commands associated with the draw call payload commands may consume more time in the state path 308 than in the payload path 306. In other words, a draw call with a small workload to process may be bifurcated by the CP 304 into a payload command for the payload path 306 and a state command for the state path 308, where the payload command does not utilize the full throughput capacity of the payload path 306 and produces an output at the output stage 326 at a first time $t_1$, and where the state command takes a long time to execute via the state path 308 and produces an output at the output stage 346 at a second time $t_2$, where $t_2$ is far greater than $t_1$ (e.g., more than 2× or 3× greater than t). This may generate inefficiencies in executing draw calls with workloads less than or equal to a workload threshold.

In some aspects, a graphics processor system may be configured to offload some of the state commands from the state path 308 to the payload path 306. For example, the graphics processor system may send constant buffers or textures to the payload path 306. Where a process outputs a plurality of small workloads (e.g., a plurality of draw calls to render rocks individually), the process may work with a texture atlas, or may use the same texture with different color blend parameters, which may result in constant buffer updates. However, such graphics processing may be optimized by not switching to a different material after each draw call. A graphics driver may be configured to group multiple draws together and send a single invocation to the GPU. The methodology may also be extended when constant buffer views are updated. The GPU hardware blocks (i.e., the shader processors and fixed function blocks of the payload path 306) may merge the sub-draws of the pseudo multi-draw invocation received from the CP 304 by maintaining the primitive order and handling constant buffer updates via the payload path 306.

In some aspects, multi-draw indirect extensions may be used to provide flexibility to a process and perform scene graph culling and other clipping operations via a dispatch call, and to create GPU-generated primitive buffers. Moreover, multi-draw indirect extensions may allow multiple sets of indirect instanced-draws to be submitted in a single API call. Such multi-draw indirect extensions may help in saving significant CPU overhead incurred by submitting the equivalent draw calls.

A graphics processing system may optimize the GPU execution of the sub-draws inside a multi-draw command by sending the state commands of the draws via a payload path, such as the payload path 306. By redirecting state commands to the payload path, the graphics processing system may reduce the work for the state path, such as the state path 308. By doing so, the sub-draws within a multi-draw command may be unrolled beyond the draw call level boundary giving a provision for the three-dimensional (3D) pipe to not have the knowledge about a draw-change within a multi-draw. Such a configuration may help reduce the scheduling overhead of the individual sub-draws and solve the small draw problem.

A driver of the graphics processing system may group multiple draws (instanced, or non-instanced) together and send a single invocation to the GPU for rendering. Grouping multiple draws into a single invocation may enable multiple draws with no render state change to come together and be processed in the payload path, such as the payload path 306, as a single unit. Grouping multiple draws into a single invocation may help reduce the overhead of the state path, such as the state path 308. In some aspects, constant buffer updates may be handled alongside draw call merging. By handling constant buffer updates alongside draw call merging, the overall number of workloads that benefit increases. Shared constant register updates may be output to the payload path 306 and the blocks responsible for scheduling the shader processor may maintain primitive/pixel order alongside handling the respective constant buffer with a level of added indirection.

Figure 5:
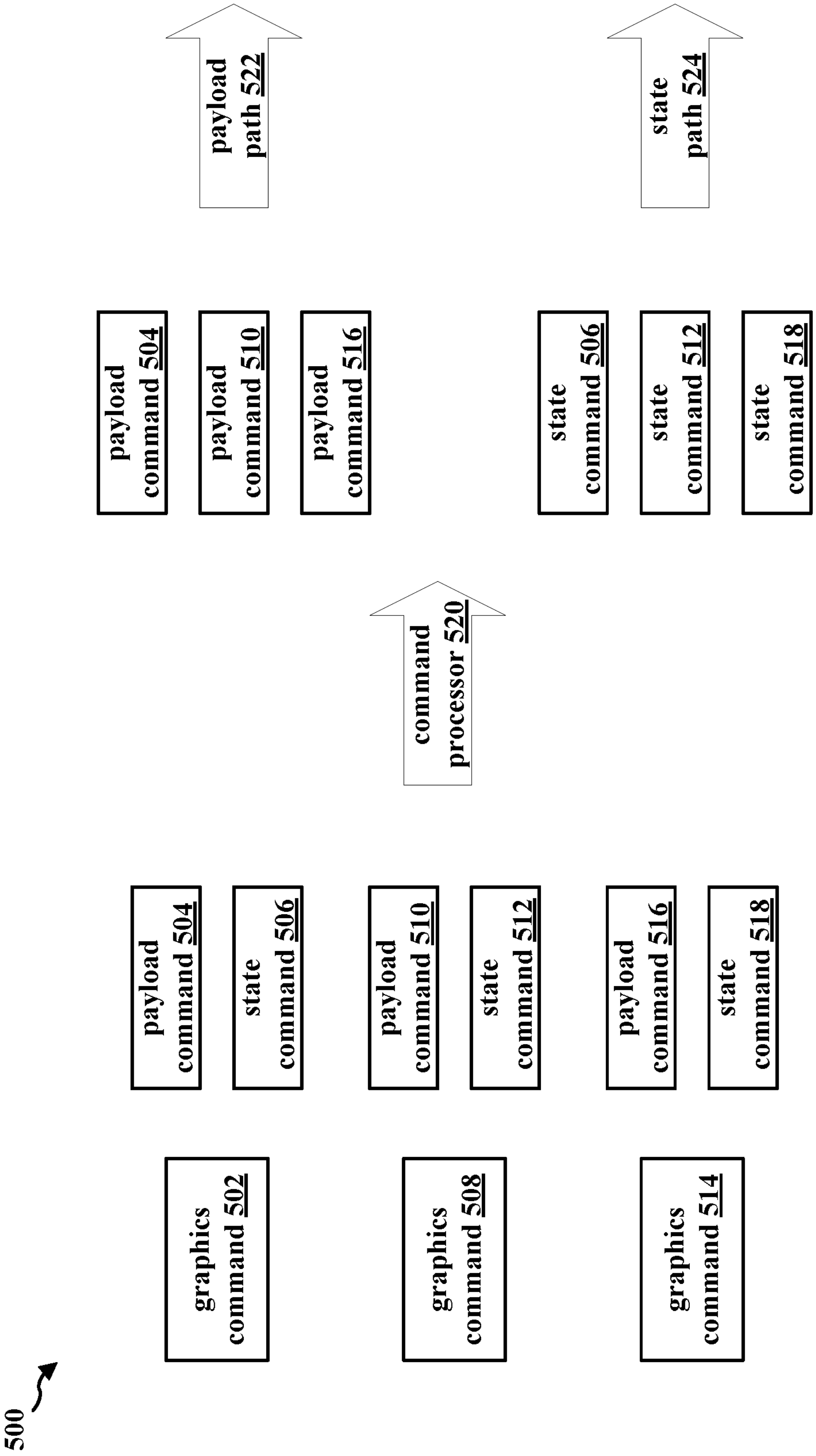
FIG. 5 is a block diagram that illustrates an example of processing for graphics commands associated with a payload path and graphics commands associated with a state path.

FIG. 5 is a block diagram 500 that illustrates an example of processing for graphics commands associated with a payload path 522 and graphics commands associated with a state path 524. A set of graphics commands, such as the graphics command 502, the graphics command 508, and the graphics command 514, may be obtained by a graphics processing system. For example, a CPU may output/transmit the set of graphics commands to a GPU or a driver of a GPU. While three graphics commands are illustrated in FIG. 5, more graphics commands may be obtained by a graphics processing system for processing by a GPU. Each graphics command may be associated with a payload command and a state command. For example, a driver of a GPU may receive a set of graphics commands and bifurcate each graphics command with a payload command and a state command. The driver may package the commands into a pseudo multi-draw command and provide the pseudo multi-draw command to a CP, such as the CP 304 in FIG. 3.

In some aspects, the set of graphics commands may have tasks that are associated with a state path or with a payload path. For example, the graphics command 502 may include a payload command 504 associated with a payload path and a state command 506 associated with a state path, the graphics command 508 may include a payload command 510 associated with a payload path and a state command 512 associated with a state path, and the graphics command 514 may include a payload command 516 associated with a payload path and a state command 518 associated with a state path. In some aspects, the graphics processing system may bifurcate the graphics commands into payload commands and state commands. For example, the graphics processing system may bifurcate the graphics command 502 into a payload command 504 associated with a payload path and a state command 506 associated with a state path, may bifurcate the graphics command 508 into a payload command 510 associated with a payload path and a state command 512 associated with a state path, and may bifurcate the graphics command 514 into a payload command 516 associated with a payload path and a state command 518 associated with a state path. For example, the graphics processing system may bifurcate constant buffer and texture commands to a state path and draw call commands to a payload path.

A command processor 520 may output the payload commands and the state commands to a payload path and a state path. For example, the command processor 520 may output the payload command 504, the payload command 510, and the payload command 516 to the payload path 522. The command processor may output the state command 506, the state command 512, and the state command 518 to the state path 524. However, if the command processor 520 simply outputs payload commands to the payload path 522 and state commands to the state path 524, the graphics processing system may not fully utilize the throughput capacity of the payload path 522, and the output of the state commands via the state path 524 may finish much later than the output of the payload commands via the payload path 522. This is particularly true for payload commands that share the same textures, constant buffers, or parts of a constant buffer (e.g., same texture but different color blend parameters, different textures common to a texture atlas).

Figure 6:
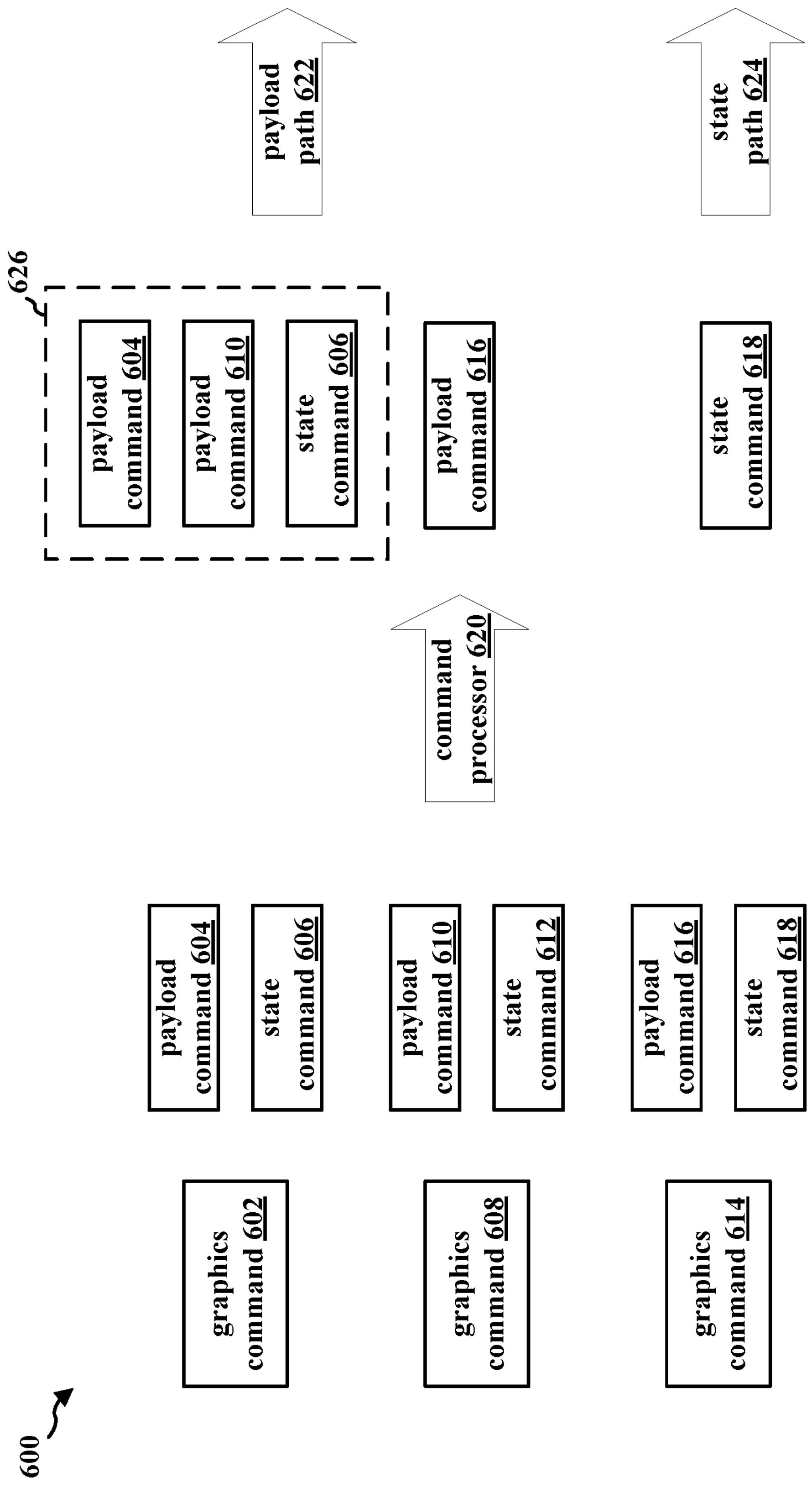
FIG. 6 is another block diagram that illustrates an example of processing for graphics commands associated with a payload path and graphics commands associated with a state path.

FIG. 6 is another block diagram 600 that illustrates an example of processing for graphics commands associated with a payload path 622 and graphics commands associated with a state path 624. A set of graphics commands, such as the graphics command 602, the graphics command 608, and the graphics command 614, may be obtained by a graphics processing system, similar to the graphics command 502, the graphics command 508, and the graphics command 514 in FIG. 5. For example, a CPU may output/transmit the set of graphics commands to a GPU or a driver of a GPU. While three graphics commands are illustrated in FIG. 6, more graphics commands may be obtained by a graphics processing system for processing by a GPU. Each graphics command may be associated with a payload command and a state command.

In some aspects, the set of graphics commands may have tasks that are associated with a state path or with a payload path. For example, the graphics command 602 may include a payload command 604 associated with a payload path and a state command 606 associated with a state path, the graphics command 608 may include a payload command 610 associated with a payload path and a state command 612 associated with a state path, and the graphics command 614 may include a payload command 616 associated with a payload path and a state command 618 associated with a state path. In some aspects, the graphics processing system may bifurcate the graphics commands into payload commands and state commands. For example, the graphics processing system may bifurcate the graphics command 602 into a payload command 604 associated with a payload path and a state command 606 associated with a state path, may bifurcate the graphics command 608 into a payload command 610 associated with a payload path and a state command 612 associated with a state path, and may bifurcate the graphics command 614 into a payload command 616 associated with a payload path and a state command 618 associated with a state path. For example, the graphics processing system may bifurcate constant buffer and texture commands to a state path and draw call commands to a payload path.

In some aspects, a state command may be common to a plurality of graphics commands. Here, the state command 606 may be common to each of the payload command 604 and the payload command 610. For example, the state command 606 may include a common texture shared by each of the payload command 604, and the payload command 610, and each of the payload command 604 and the payload command 610 may be different draw calls using the same texture (e.g., two draw calls to draw two different rocks using the same texture). In another example, the state command 606 may include a common constant buffer shared by each of the payload command 604 and the payload command 610, and each of the payload command 604 and the payload command 610 may be different draw calls using the same constant buffer (e.g., two draw calls that use the same offset information or transform information). The command processor 620 may group the two payload commands, the payload command 604 and the payload command 610, with the state command 606 in an invocation 626, and may output the invocation 626 to the payload path 622. The payload path 622 may merge the sub-draws of the pseudo multi-draw invocation and maintain the primitive order and handle constant buffer updates. In other aspects, the command processor 620 may group the two payload commands, the payload command 604 and the payload command 610, with the state commands 606 and the state command 612, and may output an invocation of the four commands to the payload path 622. The payload path 622 may hold the buffer of the state command 606 in memory as the payload path 622 processes the state command 612. For example, the payload path 722 may keep a resource common to the state commands in memory (e.g., a GPU on-chip cache). The payload path 622 may keep the resource on memory due to the spatial locality between draws. For example, the entries in a GPU on-chip cache may not be evicted out and may be used again whenever requested.

The command processor 620 may also output the payload command 616 to the payload path 622 and the state command 618 to the state path 624. Since the state command 606 that was previously associated with the state path 624 is now associated with the payload path 622, the added throughput capacity of the payload path 622 may be used to process the state command 606. Moreover, as the processing of the state command 606 is offloaded from the state path 624 to the payload path 622, the parallel output of the state path 624 may complete earlier than if the state command 606 was output to the state path 624. In addition, since the one state command, state command 606, is associated with both the payload command 604 and the payload command 610 in the invocation 626, the payload path 622 may not reload the same state, but can freeze the state in a buffer or register for both the payload command 604 and the payload command 610 while processing the invocation 626.

While FIG. 6 illustrates a command processor grouping two payload commands with a state command, more payload commands may be grouped with a state command if the state command is common to a plurality of payload commands. For example, tens or hundreds of payload commands may be grouped with a single state command (e.g., drawing hundreds of rocks using the same texture).

Figure 7:
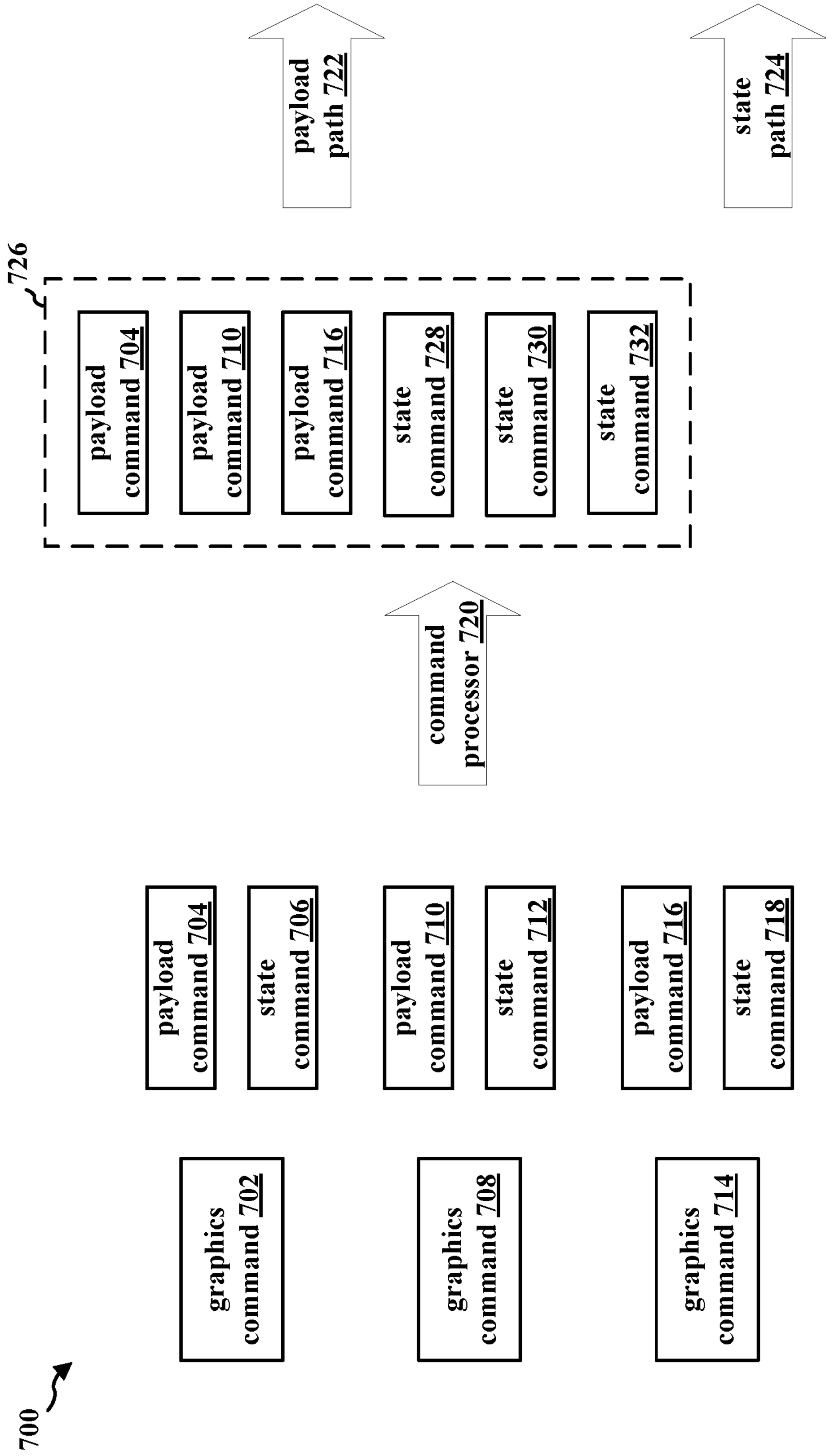
FIG. 7 is another block diagram that illustrates an example of processing for graphics commands associated with a payload path and graphics commands associated with a state path.

In some aspects, the methodology above may be extended to allow a payload path to handle constant buffer updates without a render change. FIG. 7 is another block diagram 700 that illustrates an example of processing for graphics commands associated with a payload path 722 and graphics commands associated with a state path 724. A set of graphics commands, such as the graphics command 702, the graphics command 708, and the graphics command 714, may be obtained by a graphics processing system, similar to the graphics command 502, the graphics command 508, and the graphics command 514 in FIG. 5. For example, a CPU may output/transmit the set of graphics commands to a GPU or a driver of a GPU. While three graphics commands are illustrated in FIG. 7, any number of graphics commands (e.g., three or more graphics commands) may be obtained by a graphics processing system for processing by a GPU. Each graphics command may be associated with a payload command and a state command.

In some aspects, the set of graphics commands may have tasks that are associated with a state path or with a payload path. For example, the graphics command 702 may include a payload command 704 associated with a payload path and a state command 706 associated with a state path, the graphics command 708 may include a payload command 710 associated with a payload path and a state command 712 associated with a state path, and the graphics command 714 may include a payload command 716 associated with a payload path and a state command 718 associated with a state path. In some aspects, the graphics processing system may bifurcate the graphics commands into payload commands and state commands. For example, the graphics processing system may bifurcate the graphics command 702 into a payload command 704 associated with a payload path and a state command 706 associated with a state path, may bifurcate the graphics command 708 into a payload command 710 associated with a payload path and a state command 712 associated with a state path, and may bifurcate the graphics command 714 into a payload command 716 associated with a payload path and a state command 718 associated with a state path. For example, the graphics processing system may bifurcate constant buffer and texture commands to a state path and draw call commands to a payload path.

In some aspects, a portion of a state command may be common to a plurality of graphics commands. Here, a portion of the state command 706 may be common to each of the payload command 704, the payload command 710, and the payload command 716. For example, the state command 706 may have a common texture shared by each of the payload command 704, the payload command 710, and the payload command 716, and each of the payload command 704, the payload command 710, and the payload command 716 may be different draw calls using the same texture (e.g., three draw calls to three two different rocks using the same texture), but the draw calls may use different color blend parameters. In another example, the state command 706 may have a common render state shared by each of the payload command 704, the payload command 710, and the payload command 716, and each of the payload command 704, the payload command 710, and the payload command 716 may be different draw calls using the same render state, but the payload command 704 and the payload command 710 may share a first constant buffer different than the constant buffer associated with the payload command 716. The command processor 720 may group the three payload commands, the payload command 704, the payload command 710, and the payload command 716, with the state command 728, the state command 730, and the state command 732 in an invocation 726. The invocation 726 may also be referred to as a multi-payload payload command, as the invocation 726 includes the payload command 704, the payload command 710, and the payload command 716. The invocation 726 may be referred to as a multi-payload state command, as the invocation 726 includes the state command 728, the state command 730, and the state command 732. The state command 728, the state command 730, and the state command 732 may be appended to the payload path 722 after the command processor 720 associates the state command 728 and the state command 730 with the payload path 722. The state command 728, the state command 730, and the state command 732 may include an indication that a portion of the three state commands are shared among each of the state command 706, the state command 712, and the state command 718. The state command 728, the state command 730, and the state command 732 may include an indication that a portion of the three state commands are not shared among each of the state command 706, the state command 712, and the state command 718 (e.g., the state command 706 and the state command 712 may use a first color for a common texture, but the state command 718 may use a second color for the common texture). The command processor 720 may output the invocation 726 to the payload path 722. The payload path 722 may merge the sub-draws of the pseudo multi-draw invocation and maintain the primitive order and handle constant buffer updates. The payload path 722 may use a shared buffer to load the state command 728, which indicates the common portion of each of the state command 706, the state command 712, and the state command 718, and the payload path 722 may switch a portion of the state based on the state command 730 (e.g., switching the color blend parameters of a same texture or a different index of a same texture atlas). In other words, when the command processor 720 sends the invocation 726 to the payload path 722, where the invocation 726 includes both the payload commands (payload command 704, payload command 710, and the payload command 716) and the associated state commands (state command 728, state command 730, state command 732), the payload path 722 may keep a resource common to the state commands in memory (e.g., a GPU on-chip cache). The payload path 722 may keep the resource on memory due to the spatial locality between draws. For example, the entries in a GPU on-chip cache may not be evicted out and may be used again whenever requested.

The command processor 720 may also output other state commands for other graphics commands to the state path 724, whose processing has been offloaded to the payload path 722 due to the grouping of state commands into the invocation 726.

While FIG. 7 illustrates a command processor grouping three payload commands with a common portion of a set of three state commands and differential portions of the set of three state commands, more payload commands may be grouped with a state command if the state command is common to a plurality of payload commands. For example, a set of draw calls may include 20 different vertices identified as v1 to v20, where v1-v20 have the same render state, but v1-v10 has a first common constant buffer and v11-v20 has a second common constant buffer. A graphics processing system may group all 20 draw calls into a single invocation, with the same common render state and two differential constant buffers.

Figure 8:
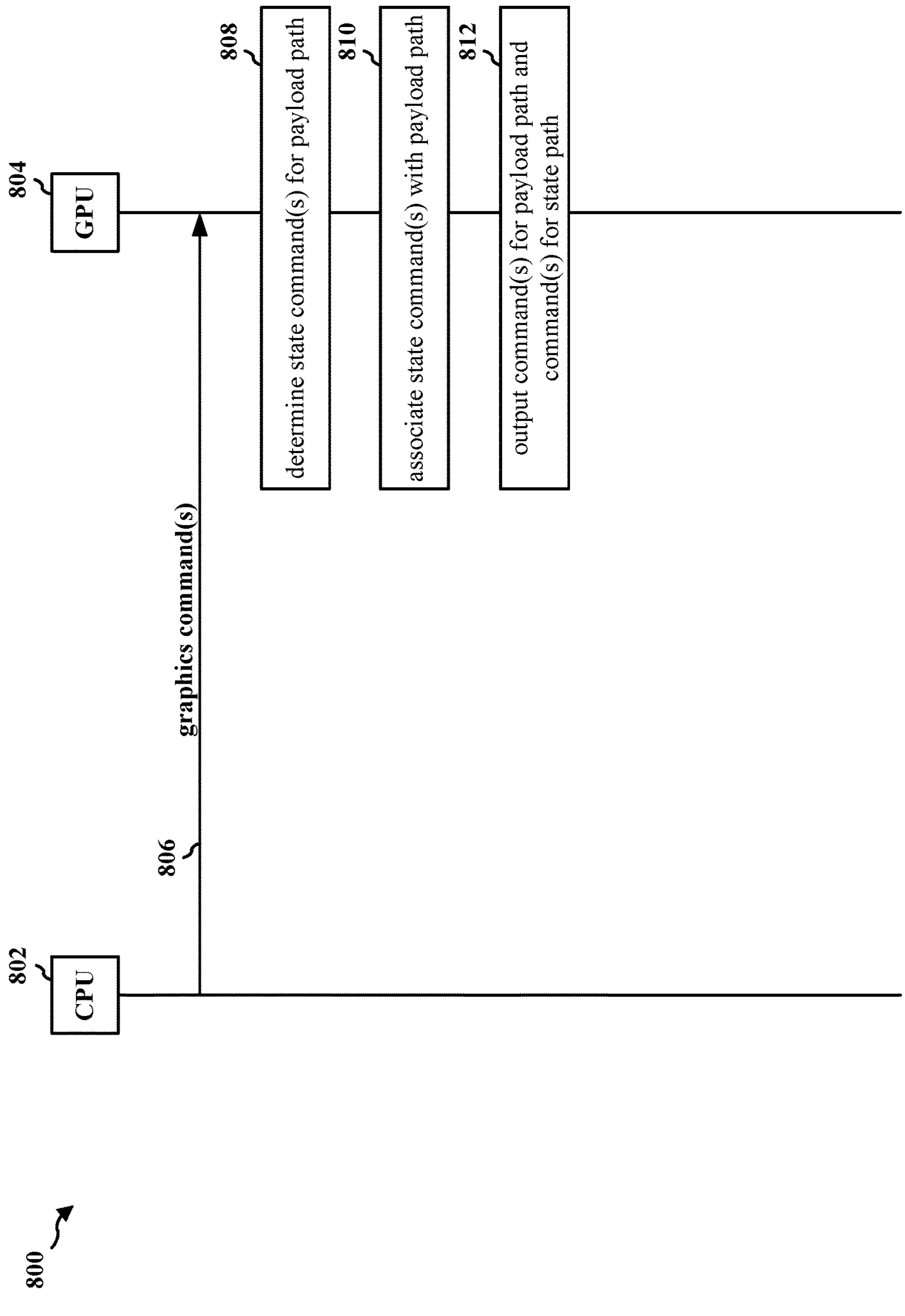
FIG. 8 is a call flow diagram illustrating example communications between a central processing unit (CPU) and a graphics processing unit (GPU) in accordance with one or more techniques of this disclosure.

FIG. 8 is a call flow diagram 800 illustrating example communications between a CPU 802 and a GPU 804 in accordance with one or more techniques of this disclosure. The CPU 802 may transmit a set of graphics commands 806 to the GPU 804. The GPU 804 may receive the set of graphics commands 806 from the CPU 802. The set of graphics commands may include a set of draw calls for the GPU 804 to execute. Each of the set of graphics commands may have a payload command and a state command associated with the corresponding graphics command. In other words, the set of graphics commands may be associated with a set of payload commands and a set of state commands. The set of graphics commands 806 may include indicators of the associated set of payload commands and the associated set of state commands, or the GPU 804 may process the set of graphics commands 806 (e.g., bifurcation) to calculate the associated set of payload commands and the associated set of state commands.

At 808, the GPU 804 may determine a set of state commands that should be associated with a payload path of the GPU 804. For example, the GPU 804 may group draw calls that have no render state change together, may group draw calls that have the same texture together, and/or may group draw calls that have the same constant buffer together. The GPU 804 may associate such common state commands with the payload path of the GPU 804. In another example, the GPU 804 may associate state commands associated with a payload command having a workload that is less than or equal to a threshold with the payload path of the GPU 804. At 810, the GPU 804 may associate the determined set of state commands with the payload path, for example by grouping a state command with a set of associated payload commands in an invocation.

At 812, the GPU 804 may output the commands associated with the payload path to the payload path (including the associated set of state commands), and may output the commands associated with the state path to the state path. For example, the GPU 804 may output the commands to a command processor, such as the CP 304 in FIG. 3. In another example, the GPU 804 may execute the commands associated with the payload path via a payload path of the GPU 804, and may execute the commands associated with the state path via a state path of the GPU 804. The payload path and the state path of the GPU 804 may be separate parallel paths for graphics processing. The throughput capacity of the payload path may be greater than the throughput capacity of the state path.

Figure 9:
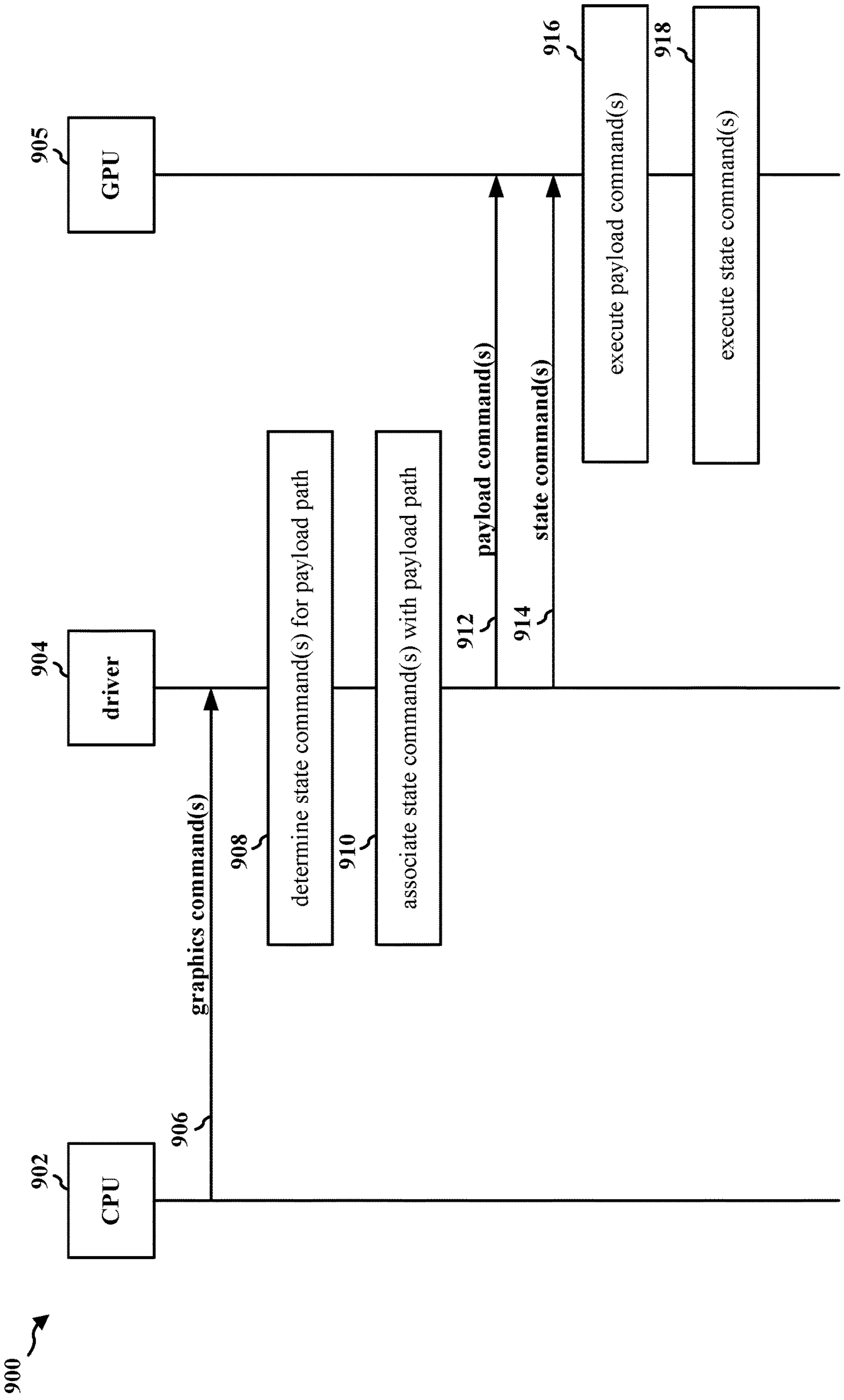
FIG. 9 is a call flow diagram illustrating example communications between a CPU, a driver, and a GPU in accordance with one or more techniques of this disclosure.

FIG. 9 is a call flow diagram 900 illustrating example communications between a CPU 902, a driver 904, and a GPU 905 in accordance with one or more techniques of this disclosure. The driver 904 may be a graphics driver for the GPU 905. The driver 904 may be a software component. The GPU 905 may be a hardware component. The GPU 905 may include a command processor, a payload path, and a state path similar to those disclosed in FIG. 3.

The CPU 902 may transmit a set of graphics commands 906 to the driver 904. The driver 904 may receive the set of graphics commands 906 from the CPU 902. The set of graphics commands may include a set of draw calls for the driver 904 to execute. Each of the set of graphics commands may have a payload command and a state command associated with the corresponding graphics command. In other words, the set of graphics commands may be associated with a set of payload commands and a set of state commands. The set of graphics commands 906 may include indicators of the associated set of payload commands and the associated set of state commands, or the driver 904 may process the set of graphics commands 906 (e.g., bifurcation) to calculate the associated set of payload commands and the associated set of state commands.

At 908, the driver 904 may determine a set of state commands that should be associated with a payload path of the GPU 905. For example, the driver 904 may group draw calls that have no render state change together, may group draw calls that have the same texture together, and/or may group draw calls that have the same constant buffer together. The driver 904 may associate such common state commands with the payload path of the GPU 905. In another example, the driver 904 may associate state commands associated with a payload command having a workload that is less than or equal to a threshold with the payload path of the GPU 905. At 910, the driver 904 may associate the determined set of state commands with the payload path of the GPU 905, for example by grouping a state command with a set of associated payload commands in an invocation.

The driver 904 may output a set of payload commands 912 to the GPU 905. The GPU 905 may receive the set of payload commands 912 from the driver 904. The driver 904 may output a set of state commands 914 to the GPU 905. The GPU 905 may receive the set of state commands 914 from the driver 904. While FIG. 9 illustrates the driver 904 outputting the set of payload commands 912 before outputting the set of state commands 914, the driver 904 may output the set of payload commands 912 and the set of state commands 914 in parallel, and/or interweaved with one another. In other words, the driver 904 may output the set of payload commands 912 and the set of state commands 914 in any suitable order to the GPU 905. The GPU 905 may obtain the set of payload commands 912 and the set of state commands 914 from the driver 904. The set of payload commands 912 may include the associated set of state commands associated at 910. For example, the set of payload commands 912 may include multi-draw calls that are associated with a common state command, and/or multi-draw calls that are associated with a common state command and differential state commands (e.g., constant buffer updates).

At 916, the GPU 905 may execute the set of payload commands 912. At 918 the GPU 905 may execute the set of state commands 914. While FIG. 9 illustrates the GPU 905 executing the set of payload commands 912 before executing the set of state commands 914, the GPU 905 may execute the set of payload commands 912 and the set of state commands 914 in parallel, and/or may interweave execution of the set of payload commands 912 and the set of state commands 914. In other words, the GPU 905 may execute the set of payload commands 912 and the set of state commands 914 in any suitable order. The payload path and the state path of the GPU 905 may be separate parallel paths for graphics processing. The throughput capacity of the payload path may be greater than the throughput capacity of the state path.

The disclosed graphics processor system may improve the benchmarks for rendering graphics for various applications, for example games on a mobile device. Table 1 below illustrates potential merged draw call benefits for system utilizing the disclosed graphics processor system.

TABLE 1

Potential Merged Draws for Applications with Draw Calls Having No Render State Changes Apart From Constant Buffer Updates

| Benchmark Application | Total number of 3D draw calls | Average number of primitives at Input Assembly stage | Number of draw calls with CBV updates in between (across cmd-lists) | Total number of potential merged draws |
|---|---|---|---|---|
| App. 1 | 11673 | 947 | 2962 (25.37%) | 782 |
| App. 2 | 14452 | 156 | 12425 (85.97%) | 1652 |

TABLE 1-continued

Potential Merged Draws for Applications with Draw Calls Having No Render State Changes Apart From Constant Buffer Updates

| Benchmark Application | Total number of 3D draw calls | Average number of primitives at Input Assembly stage | Number of draw calls with CBV updates in between (across cmd-lists) | Total number of potential merged draws |
|---|---|---|---|---|
| App. 3 | 8433 | 1082 | 3195 (37.88%) | 582 |
| App. 4 | 7088 | 2001 | 2902 (40.9%) | 1069 |

The total number of draw calls spread across multiple command-lists may be reduced when merged into multi-draw invocations. The workloads may use instanced draw calls or indexes to instanced draw calls. Some of the draw calls may have no render state change, and may have constant buffer updates in between the draw calls. The percentage of draw calls with a single constant buffer view (CBV) update in between the draw calls is listed in column 4. As shown in Table 1, merging draws with constant buffer updates may substantially reduce the overall number of small draws (e.g., workloads that are less than or equal to a workload threshold).

In some aspects, a graphics processor system utilizing the same GPU may have a first benchmark test having a number of draw-calls (e.g., 100 draw-calls) with 1 triangle each and constant buffer updates in between and a second benchmark test having 1 draw-call having the same number of triangles (e.g., 100 triangles) with a single constant buffer holding similar information. The constant buffer may be used for getting the transform information for the vertices to scatter the triangles to different locations in the view space. The second benchmark test may see a reduction of 75.6% in time (e.g., from 46.285 μs to 11.271 μs).

Figure 10:
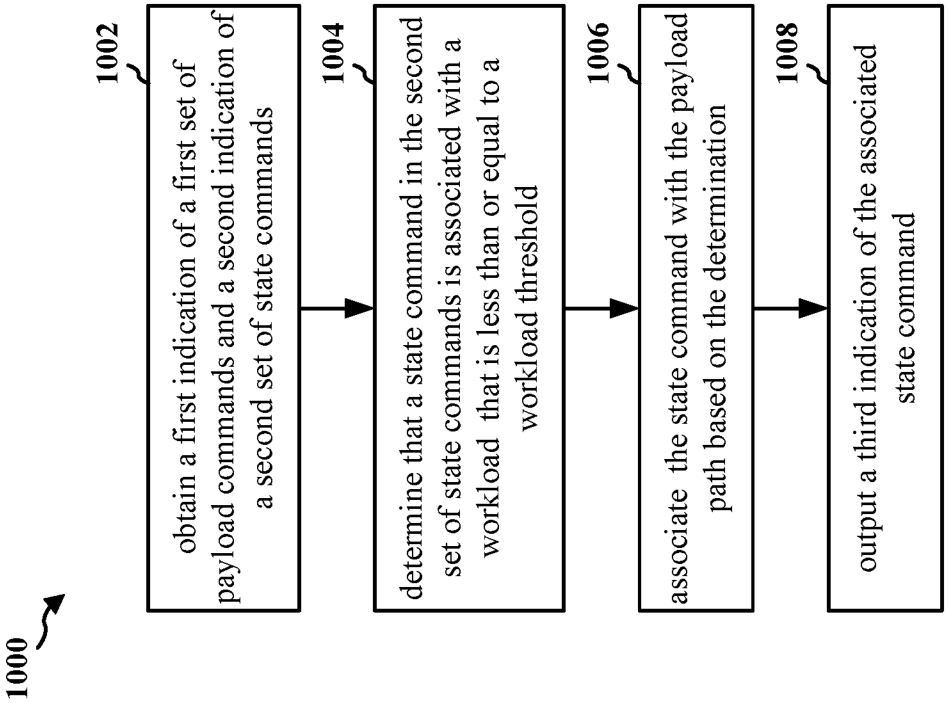
FIG. 10 is a flowchart of an example method of graphics processing in accordance with one or more techniques of this disclosure.

FIG. 10 is a flowchart 1000 of an example method of graphics processing in accordance with one or more techniques of this disclosure. The method may be performed by an apparatus, such as an apparatus for graphics processing, a GPU, a GPU driver, a CPU, a wireless communication device (e.g., a user equipment), and the like, as used in connection with the aspects of FIGS. 1-9.

At 1002, the apparatus may obtain a first indication of a first set of payload commands and a second indication of a second set of state commands. The first set of payload commands may be associated with a payload path. The second set of state commands may be associated with a state path. For example, 1002 may be performed by the GPU 804 in FIG. 8, which may obtain an indication of a set of payload commands and an indication of a set of state commands via the set of graphics commands 806. For example, the set of graphics commands 806 may include an indication of a set of payload commands with associated state commands. In another example, a driver of the GPU 804 may bifurcate each of the set of graphics commands 806 into associated pairs of payload commands and state commands. The set of payload commands may be associated with a payload path of the GPU 804 (i.e. assigned to the payload path by default, such as the payload path 306 in FIG. 3). The set of state commands may be associated with a state path of the GPU 804 (i.e. assigned to the state path by default, such as the state path 308 in FIG. 3). In another example, the GPU 804 in FIG. 8 may, at 808, bifurcate the set of graphics commands 806 into the set of payload commands and the set of state commands. Moreover, 1002 may be performed by the graphics command optimizer 198 in FIG. 1.

At 1004, the apparatus may determine that a state command in the second set of state commands is associated with a workload that is less than or equal to a workload threshold. For example, 1004 may be performed by the GPU 804 in FIG. 8, which may, at 808, determine that a state command in the set of state commands, of the set of graphics commands 806, is associated with a workload that is less than or equal to a workload threshold (e.g., draw call of less than 128 triangles). Moreover, 1004 may be performed by the graphics command optimizer 198 in FIG. 1.

At 1006, the apparatus may associate the state command with the payload path based on the determination. For example, 1006 may be performed by the GPU 804 in FIG. 8, which may, at 810, associate the state command with the payload path based on the determination at 1004. Moreover, 1006 may be performed by the graphics command optimizer 198 in FIG. 1.

At 1008, the apparatus may output a third indication of the associated state command. For example, 1008 may be performed by the GPU 804 in FIG. 8, which may, at 812, output an indication of the associated state command. In one aspect, the GPU 804 may output the state command to a state path of the GPU 804. In another aspect, the GPU 804 may transmit an indication of the state command to a component with a state path. In another aspect, the GPU 804 my store the indication of the state command in a state path cache that outputs the indication to the state path as state path resources are freed. Moreover, 1008 may be performed by the graphics command optimizer 198 in FIG. 1.

Figure 11:
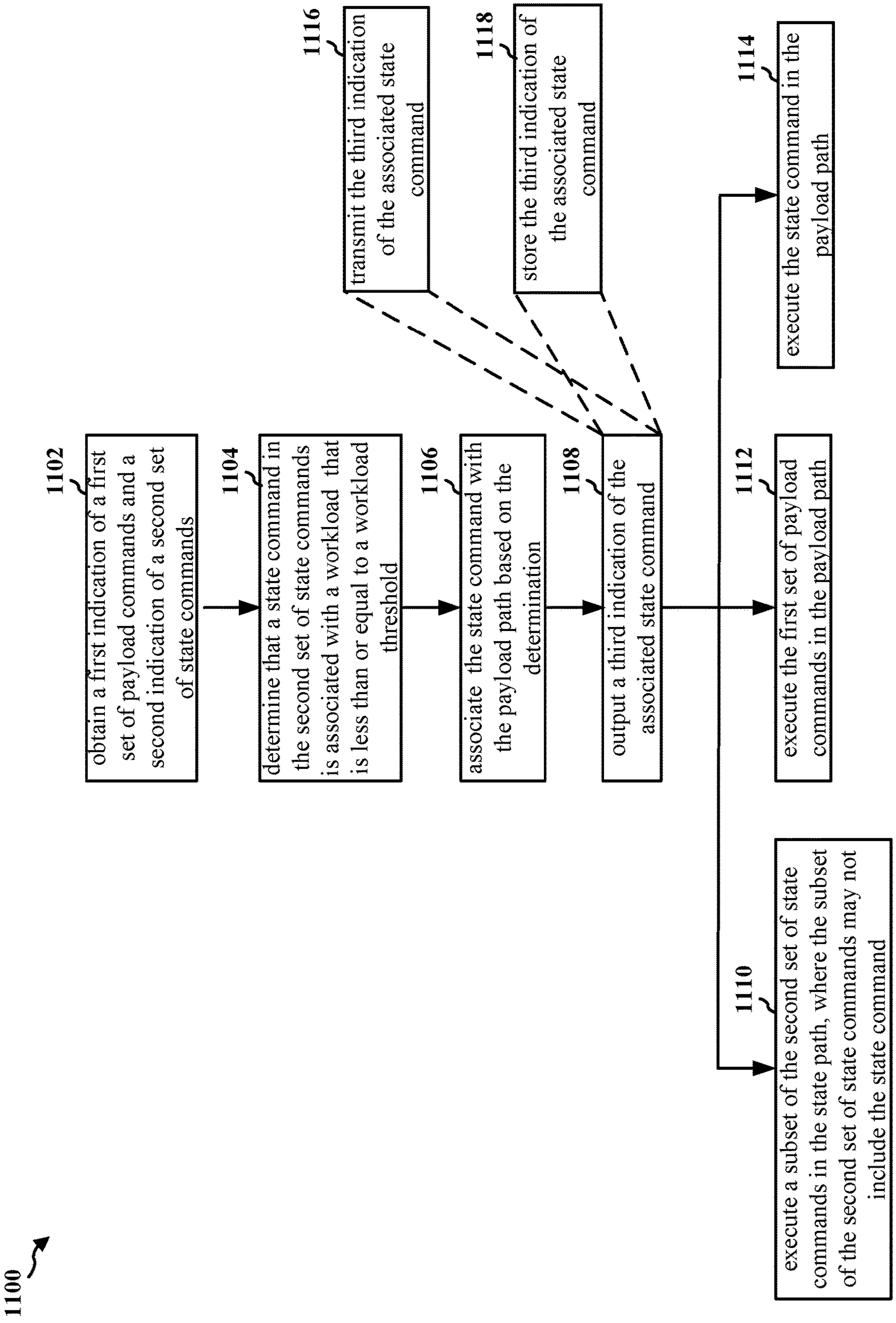
FIG. 11 is a flowchart of an example method of graphics processing in accordance with one or more techniques of this disclosure.

FIG. 11 is a flowchart 1100 of an example method of graphics processing in accordance with one or more techniques of this disclosure. The method may be performed by an apparatus, such as an apparatus for graphics processing, a GPU, a GPU driver, a CPU, a wireless communication device (e.g., a user equipment), and the like, as used in connection with the aspects of FIGS. 1-9.

At 1102, the apparatus may obtain a first indication of a first set of payload commands and a second indication of a second set of state commands. The first set of payload commands may be associated with a payload path. The second set of state commands may be associated with a state path. For example, 1102 may be performed by the GPU 804 in FIG. 8, which may obtain an indication of a set of payload commands and an indication of a set of state commands via the set of graphics commands 806. For example, the set of graphics commands 806 may include an indication of a set of payload commands with associated state commands. In another example, a driver of the GPU 804 may bifurcate each of the set of graphics commands 806 into associated pairs of payload commands and state commands. The set of payload commands may be associated with a payload path of the GPU 804 (i.e. assigned to the payload path by default, such as the payload path 306 in FIG. 3). The set of state commands may be associated with a state path of the GPU 804 (i.e. assigned to the state path by default, such as the state path 308 in FIG. 3). In another example, the GPU 804 in FIG. 8 may, at 808, bifurcate the set of graphics commands 806 into the set of payload commands and the set of state commands. Moreover, 1102 may be performed by the graphics command optimizer 198 in FIG. 1.

At 1104, the apparatus may determine that a state command in the second set of state commands is associated with a workload that is less than or equal to a workload threshold. For example, 1104 may be performed by the GPU 804 in FIG. 8, which may, at 808, determine that a state command in the set of state commands, of the set of graphics commands 806, is associated with a workload that is less than or equal to a workload threshold (e.g., draw call of less than 128 triangles). Moreover, 1104 may be performed by the graphics command optimizer 198 in FIG. 1.

At 1106, the apparatus may associate the state command with the payload path based on the determination. For example, 1106 may be performed by the GPU 804 in FIG. 8, which may, at 810, associate the state command with the payload path based on the determination at 1104. Moreover, 1106 may be performed by the graphics command optimizer 198 in FIG. 1.

At 1108, the apparatus may output a third indication of the associated state command. For example, 1108 may be performed by the GPU 804 in FIG. 8, which may, at 812, output an indication of the associated state command. In one aspect, the GPU 804 may output the state command to a state path of the GPU 804. In another aspect, the GPU 804 may transmit an indication of the state command to a component with a state path. In another aspect, the GPU 804 my store the indication of the state command in a state path cache that outputs the indication to the state path as state path resources are freed. Moreover, 1108 may be performed by the graphics command optimizer 198 in FIG. 1.

At 1110, the apparatus may execute a subset of the second set of state commands in the state path. The subset of the second set of state commands may not include the state command. For example, 1110 may be performed by the GPU 804 in FIG. 8, which may execute a subset of the second set of state commands in the state path. For example, at 1108, a command processor of the GPU 804 may output an indication of the subset of the second set of state commands in the state path to a state path of the GPU 804. The state path may then execute the subset of the second set of state commands. The subset of the second set of state commands may not include the state command that is now associated with the payload path. Moreover, 1110 may be performed by the graphics command optimizer 198 in FIG. 1.

At 1112, the apparatus may execute the first set of payload commands in the payload path. For example, 1112 may be performed by the GPU 804 in FIG. 8, which may execute the set of payload commands in the payload path. For example, at 1108, a command processor of the GPU 804 may output an indication of the set of payload commands to a payload path of the GPU 804. The payload path may then execute the set of payload commands. Moreover, 1112 may be performed by the graphics command optimizer 198 in FIG. 1.

At 1114, the apparatus may execute the state command in the payload path. For example, 1114 may be performed by the GPU 804 in FIG. 8, which may execute the state command in the payload path. For example, at 1108, a command processor of the GPU 804 may output the indication of the state command to a payload path of the GPU 804. The payload path may then execute the state command. In some aspects, the command processor may append the state command to the end of the set of payload commands of the payload path. Moreover, 1114 may be performed by the graphics command optimizer 198 in FIG. 1.

At 1116, the apparatus may output the indication of the associated state command by transmitting the third indication of the associated state command. For example, 1116 may be performed by the GPU 804 in FIG. 8, which may, at 812, transmit the indication of the associated state command to a component that has a payload path. Moreover, 1116 may be performed by the graphics command optimizer 198 in FIG. 1.

At 1118, the apparatus may output the indication of the associated state command by storing the third indication of the associated state command. For example, 1118 may be performed by the GPU 804 in FIG. 8, which may, at 812, store the indication of the associated state command, for example in a payload path cache that queues commands to be executed by the payload path. Moreover, 1118 may be performed by the graphics command optimizer 198 in FIG. 1.

Figure 12:
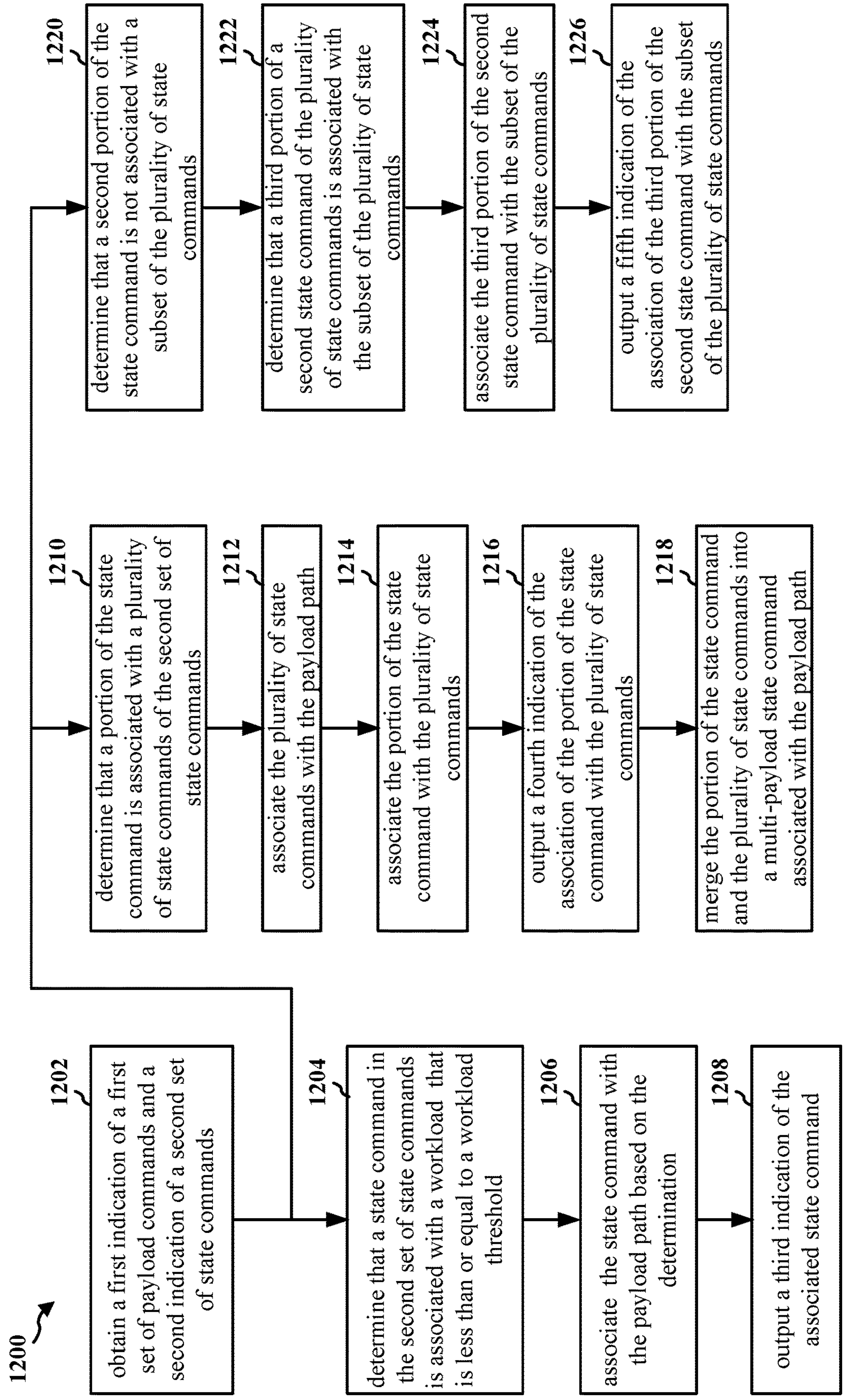
FIG. 12 is a flowchart of an example method of graphics processing in accordance with one or more techniques of this disclosure.

FIG. 12 is a flowchart 1200 of an example method of graphics processing in accordance with one or more techniques of this disclosure. The method may be performed by an apparatus, such as an apparatus for graphics processing, a GPU, a GPU driver, a CPU, a wireless communication device (e.g., a user equipment), and the like, as used in connection with the aspects of FIGS. 1-9.

At 1202, the apparatus may obtain a first indication of a first set of payload commands and a second indication of a second set of state commands. The first set of payload commands may be associated with a payload path. The second set of state commands may be associated with a state path. For example, 1202 may be performed by the GPU 804 in FIG. 8, which may obtain an indication of a set of payload commands and an indication of a set of state commands via the set of graphics commands 806. For example, the set of graphics commands 806 may include an indication of a set of payload commands with associated state commands. In another example, a driver of the GPU 804 may bifurcate each of the set of graphics commands 806 into associated pairs of payload commands and state commands. The set of payload commands may be associated with a payload path of the GPU 804 (i.e. assigned to the payload path by default, such as the payload path 306 in FIG. 3). The set of state commands may be associated with a state path of the GPU 804 (i.e. assigned to the state path by default, such as the state path 308 in FIG. 3). In another example, the GPU 804 in FIG. 8 may, at 808, bifurcate the set of graphics commands 806 into the set of payload commands and the set of state commands. Moreover, 1202 may be performed by the graphics command optimizer 198 in FIG. 1.

At 1204, the apparatus may determine that a state command in the second set of state commands is associated with a workload that is less than or equal to a workload threshold. For example, 1204 may be performed by the GPU 804 in FIG. 8, which may, at 808, determine that a state command in the set of state commands, of the set of graphics commands 806, is associated with a workload that is less than or equal to a workload threshold (e.g., draw call of less than 128 triangles). Moreover, 1204 may be performed by the graphics command optimizer 198 in FIG. 1.

At 1206, the apparatus may associate the state command with the payload path based on the determination. For example, 1206 may be performed by the GPU 804 in FIG. 8, which may, at 810, associate the state command with the payload path based on the determination at 1204. Moreover, 1206 may be performed by the graphics command optimizer 198 in FIG. 1.

At 1208, the apparatus may output a third indication of the associated state command. For example, 1208 may be performed by the GPU 804 in FIG. 8, which may, at 812, output an indication of the associated state command. In one aspect, the GPU 804 may output the state command to a state path of the GPU 804. In another aspect, the GPU 804 may transmit an indication of the state command to a component with a state path. In another aspect, the GPU 804 my store the indication of the state command in a state path cache that outputs the indication to the state path as state path resources are freed. Moreover, 1208 may be performed by the graphics command optimizer 198 in FIG. 1.

At 1210, the apparatus may determine that a portion of the state command is associated with a plurality of state commands of the second set of state commands. For example, 1210 may be performed by the GPU 804 in FIG. 8, which may, at 808, determine that a portion of the state command is associated with a plurality of state commands of the set of state commands. In other words, the plurality of state commands may have a constant buffer that is common to the plurality of state commands, for example a common texture or a common texture atlas. Moreover, 1210 may be performed by the graphics command optimizer 198 in FIG. 1.

At 1212, the apparatus may associate the plurality of state commands with the payload path. For example, 1212 may be performed by the GPU 804 in FIG. 8, which may, at 810, associate the plurality of state commands with the payload path. Moreover, 1212 may be performed by the graphics command optimizer 198 in FIG. 1.

At 1214, the apparatus may associate the portion of the state command with the plurality of state commands. For example, 1214 may be performed by the GPU 804 in FIG. 8, which may, at 810, associate the portion of the state command with the plurality of state commands. Moreover, 1214 may be performed by the graphics command optimizer 198 in FIG. 1.

At 1216, the apparatus may output a fourth indication of the association of the portion of the state command with the plurality of state commands. For example, 1216 may be performed by the GPU 804 in FIG. 8, which may, at 812, output an indication of the association of the portion of the state command with the plurality of state commands. For example, the GPU 804 may indicate to a payload path that the plurality of state commands have a constant buffer that is common to the plurality of state commands. The indication may include a multi-payload state command, or a pseudo multi-draw invocation. The payload path may merge the sub-draws of the invocation and maintain the primitive order and handle constant buffer updates. Moreover, 1216 may be performed by the graphics command optimizer 198 in FIG. 1.

At 1218, the apparatus may merge the portion of the state command and the plurality of state commands into a multi-payload state command associated with the payload path. For example, 1218 may be performed by the GPU 804 in FIG. 8, which may, at 812, merge the portion of the state command and the plurality of state commands into a multi-payload state command associated with the payload path. The GPU 804 may output the multi-payload state command as a pseudo multi-draw invocation. Moreover, 1218 may be performed by the graphics command optimizer 198 in FIG. 1.

At 1220, the apparatus may determine that a second portion of the state command is not associated with a subset of the plurality of state commands. For example, 1220 may be performed by the GPU 804 in FIG. 8, which may, at 808, determine that a portion of the state command is not associated with a subset of the plurality of state commands. For example, the state command may share a common texture with the plurality of state commands, but the state command may use a different color (e.g., red) from the subset of the plurality of state commands (e.g., blue). Moreover, 1220 may be performed by the graphics command optimizer 198 in FIG. 1.

At 1222, the apparatus may determine that a third portion of a second state command of the plurality of state commands is associated with the subset of the plurality of state commands. For example, 1222 may be performed by the GPU 804 in FIG. 8, which may, at 808, determine that a portion of a different state command of the plurality of state commands is associated with the subset of the plurality of state commands. Moreover, 1222 may be performed by the graphics command optimizer 198 in FIG. 1.

At 1224, the apparatus may associate the third portion of the second state command with the subset of the plurality of state commands. For example, 1224 may be performed by the GPU 804 in FIG. 8, which may, at 810, associate the portion of the different state command with the subset of the plurality of state commands. Moreover, 1224 may be performed by the graphics command optimizer 198 in FIG. 1.

At 1226, the apparatus may output a fifth indication of the association of the third portion of the second state command with the subset of the plurality of state commands. For example, 1226 may be performed by the GPU 804 in FIG. 8, which may, at 812, output an indication of the association of the portion of the different state command with the subset of the plurality of state commands. Moreover, 1226 may be performed by the graphics command optimizer 198 in FIG. 1.

Figure 13:
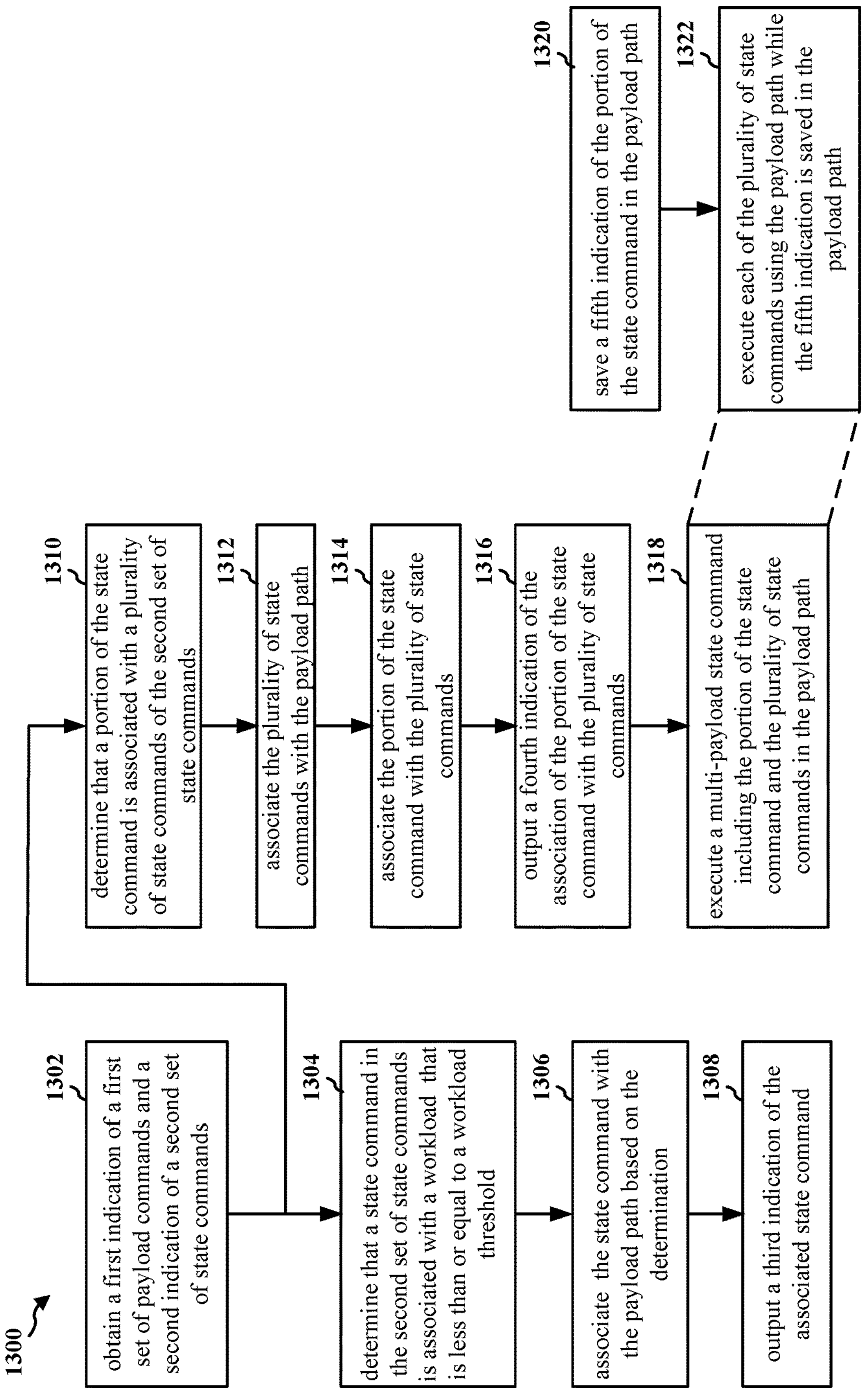
FIG. 13 is a flowchart of an example method of graphics processing in accordance with one or more techniques of this disclosure.

FIG. 13 is a flowchart 1300 of an example method of graphics processing in accordance with one or more techniques of this disclosure. The method may be performed by an apparatus, such as an apparatus for graphics processing, a GPU, a GPU driver, a CPU, a wireless communication device (e.g., a user equipment), and the like, as used in connection with the aspects of FIGS. 1-9.

At 1302, the apparatus may obtain a first indication of a first set of payload commands and a second indication of a second set of state commands. The first set of payload commands may be associated with a payload path. The second set of state commands may be associated with a state path. For example, 1302 may be performed by the GPU 804 in FIG. 8, which may obtain an indication of a set of payload commands and an indication of a set of state commands via the set of graphics commands 806. For example, the set of graphics commands 806 may include an indication of a set of payload commands with associated state commands. In another example, a driver of the GPU 804 may bifurcate each of the set of graphics commands 806 into associated pairs of payload commands and state commands. The set of payload commands may be associated with a payload path of the GPU 804 (i.e. assigned to the payload path by default, such as the payload path 306 in FIG. 3). The set of state commands may be associated with a state path of the GPU 804 (i.e. assigned to the state path by default, such as the state path 308 in FIG. 3). In another example, the GPU 804 in FIG. 8 may, at 808, bifurcate the set of graphics commands 806 into the set of payload commands and the set of state commands. Moreover, 1302 may be performed by the graphics command optimizer 198 in FIG. 1.

At 1304, the apparatus may determine that a state command in the second set of state commands is associated with a workload that is less than or equal to a workload threshold. For example, 1304 may be performed by the GPU 804 in FIG. 8, which may, at 808, determine that a state command in the set of state commands, of the set of graphics commands 806, is associated with a workload that is less than or equal to a workload threshold (e.g., draw call of less than 138 triangles). Moreover, 1304 may be performed by the graphics command optimizer 198 in FIG. 1.

At 1306, the apparatus may associate the state command with the payload path based on the determination. For example, 1306 may be performed by the GPU 804 in FIG. 8, which may, at 810, associate the state command with the payload path based on the determination at 1304. Moreover, 1306 may be performed by the graphics command optimizer 198 in FIG. 1.

At 1308, the apparatus may output a third indication of the associated state command. For example, 1308 may be performed by the GPU 804 in FIG. 8, which may, at 812, output an indication of the associated state command. In one aspect, the GPU 804 may output the state command to a state path of the GPU 804. In another aspect, the GPU 804 may transmit an indication of the state command to a component with a state path. In another aspect, the GPU 804 my store the indication of the state command in a state path cache that outputs the indication to the state path as state path resources are freed. Moreover, 1308 may be performed by the graphics command optimizer 198 in FIG. 1.

At 1310, the apparatus may determine that a portion of the state command is associated with a plurality of state commands of the second set of state commands. For example, 1310 may be performed by the GPU 804 in FIG. 8, which may, at 808, determine that a portion of the state command is associated with a plurality of state commands of the set of state commands. In other words, the plurality of state commands may have a constant buffer that is common to the plurality of state commands, for example a common texture or a common texture atlas. Moreover, 1310 may be performed by the graphics command optimizer 198 in FIG. 1.

At 1312, the apparatus may associate the plurality of state commands with the payload path. For example, 1312 may be performed by the GPU 804 in FIG. 8, which may, at 810, associate the plurality of state commands with the payload path. Moreover, 1312 may be performed by the graphics command optimizer 198 in FIG. 1.

At 1314, the apparatus may associate the portion of the state command with the plurality of state commands. For example, 1314 may be performed by the GPU 804 in FIG. 8, which may, at 810, associate the portion of the state command with the plurality of state commands. Moreover, 1314 may be performed by the graphics command optimizer 198 in FIG. 1.

At 1316, the apparatus may output a fourth indication of the association of the portion of the state command with the plurality of state commands. For example, 1316 may be performed by the GPU 804 in FIG. 8, which may, at 812, output an indication of the association of the portion of the state command with the plurality of state commands. For example, the GPU 804 may indicate to a payload path that the plurality of state commands have a constant buffer that is common to the plurality of state commands. The indication may include a multi-payload state command, or a pseudo multi-draw invocation. The payload path may merge the sub-draws of the invocation and maintain the primitive order and handle constant buffer updates. Moreover, 1316 may be performed by the graphics command optimizer 198 in FIG. 1.

At 1318, the apparatus may execute a multi-payload state command including the portion of the state command and the plurality of state commands in the payload path. For example, 1318 may be performed by the GPU 804 in FIG. 8, which may, at 812, execute a multi-payload state command in the payload path. The multi-payload state command may include an indicator of the portion of the state command and an indicator of the plurality of state commands (e.g., that the plurality of state commands all share at least a portion of a constant buffer). Moreover, 1318 may be performed by the graphics command optimizer 198 in FIG. 1.

At 1320, the apparatus may save a fifth indication of the portion of the state command in the payload path. For example, 1320 may be performed by the GPU 804 in FIG. 8, which may save an indication of the portion of the state command in the payload path. For example, as the payload path of the GPU 804 executes a set of state commands that share a constant buffer, the payload path of the GPU 804 may hold that constant buffer in memory while the set of state commands are executed instead of reloading the constant buffer for each of the set of state commands. Moreover, 1320 may be performed by the graphics command optimizer 198 in FIG. 1.

At 1322, the apparatus may execute the multi-payload state command by executing each of the plurality of state commands using the payload path while the fifth indication is saved in the payload path. For example, 1322 may be performed by the GPU 804 in FIG. 8, which may, at 812, execute each of the plurality of state commands using the payload path while the indication (e.g., constant buffer) is saved in the payload path. Moreover, 1322 may be performed by the graphics command optimizer 198 in FIG. 1.

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may include means for obtaining a first indication of a first set of payload commands and a second indication of a second set of state commands. The first set of payload commands may be associated with a payload path. The second set of state commands may be associated with a state path. The apparatus may further include means for determining that a state command in the second set of state commands is associated with a workload that is less than or equal to a workload threshold. The apparatus may further include means for associating the state command with the payload path based on the determination. The apparatus may further include means for and outputting a third indication of the associated state command. The apparatus may further include means for executing the state command in the payload path after the output of the third indication. The apparatus may further include means for executing the first set of payload commands in the payload path. The apparatus may further include means for executing a subset of the second set of state commands in the state path. The subset of the second set of state commands may not include the state command. The apparatus may further include means for determining that a portion of the state command is associated with a plurality of state commands of the second set of state commands. The apparatus may further include means for associating the plurality of state commands with the payload path. The apparatus may further include means for associating the portion of the state command with the plurality of state commands. The apparatus may further include means for outputting a fourth indication of the association of the portion of the state command with the plurality of state commands. The state command may include a configuration of a common resource (e.g., a common texture, a common constant buffer) associated with the plurality of state commands. The apparatus may further include means for determining that a second portion of the state command is not associated with a subset of the plurality of state commands. The apparatus may further include means for determining that a third portion of a second state command of the plurality of state commands is associated with the subset of the plurality of state commands. The apparatus may further include means for associating the third portion of the second state command with the subset of the plurality of state commands. The apparatus may further include means for outputting a fifth indication of the association of the third portion of the second state command with the subset of the plurality of state commands. The third portion of the second state command may include a common constant buffer. The apparatus may further include means for associating the portion of the state command with the plurality of state commands by merging the portion of the state command and the plurality of state commands into a multi-payload state command associated with the payload path. The multi-payload state command may include a plurality of draw calls. The apparatus may further include means for executing the multi-payload state command in the payload path after the output of the fourth indication. The apparatus may further include means for executing the multi-payload state command in the payload path by (a) saving a fifth indication of the portion of the state command in the payload path, and (b) executing each of the plurality of state commands using the payload path while the fifth indication is saved in the payload path. For example, a payload path may process a plurality of draw calls sharing a same constant resource together and process them as a single whole chunk so that the programming is done once for the plurality of draw calls. The payload path may hold the constant resource in memory while executing the set of state commands that share the same constant resource instead of reloading the constant resource for each of the set of associated state commands. The portion of the state command may include a common render state. The first set of payload commands may include a set of draw calls. The apparatus may further include means for outputting the third indication of the associated state command by transmitting the third indication of the associated state command. The apparatus may further include means for outputting the third indication of the associated state command by transmitting the third indication of the associated state command. The apparatus may further include means for executing the state command in the payload path.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for." Unless stated otherwise, the phrase "a processor" may refer to "any of one or more processors" (e.g., one processor of one or more processors, a number (greater than one) of processors in the one or more processors, or all of the one or more processors) and the phrase "a memory" may refer to "any of one or more memories" (e.g., one memory of one or more memories, a number (greater than one) of memories in the one or more memories, or all of the one or more memories).

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may include RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily utilize realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of graphics processing, comprising: obtaining a first indication of a first set of payload commands and a second indication of a second set of state commands, wherein the first set of payload commands is associated with a payload path, wherein the second set of state commands is associated with a state path; determining that a state command in the second set of state commands is associated with a workload that is less than or equal to a workload threshold; associating the state command with the payload path based on the determination; and outputting a third indication of the associated state command.

Aspect 2 is the method of aspect 1, further comprising executing the state command in the payload path after the output of the third indication.

Aspect 3 is the method of aspect 2, further comprising: executing the first set of payload commands in the payload path; and executing a subset of the second set of state commands in the state path, wherein the subset of the second set of state commands does not include the state command.

Aspect 4 is the method of any of aspects 1 to 3, further comprising: determining that a portion of the state command is associated with a plurality of state commands of the second set of state commands; associating the plurality of state commands with the payload path; associating the portion of the state command with the plurality of state commands; and outputting a fourth indication of the association of the portion of the state command with the plurality of state commands.

Aspect 5 is the method of aspect 4, wherein the state command comprises a configuration of a common resource (e.g., a common texture, a common constant buffer) associated with the plurality of state commands.

Aspect 6 is the method of either of aspects 4 or 5, further comprising: determining that a second portion of the state command is not associated with a subset of the plurality of state commands; determining that a third portion of a second state command of the plurality of state commands is associated with the subset of the plurality of state commands; associating the third portion of the second state command with the subset of the plurality of state commands; and outputting a fifth indication of the association of the third portion of the second state command with the subset of the plurality of state commands.

Aspect 7 is the method of aspect 6, wherein the third portion of the second state command comprises a common constant buffer.

Aspect 8 is the method of any of aspects 4 to 7, wherein associating the portion of the state command with the plurality of state commands comprises merging the portion of the state command and the plurality of state commands into a multi-payload state command associated with the payload path.

Aspect 9 is the method of aspect 8, wherein the multi-payload state command comprises a plurality of draw calls.

Aspect 10 is the method of either of aspects 8 or 9, further comprising: executing the multi-payload state command in the payload path after the output of the fourth indication.

Aspect 11 is the method of aspect 10, wherein executing the multi-payload state command in the payload path comprises: saving a fifth indication of the portion of the state command in the payload path; and executing each of the plurality of state commands using the payload path while the fifth indication is saved in the payload path.

Aspect 12 is the method of any of aspects 4 to 11, wherein the portion of the state command comprises a common render state.

Aspect 13 is the method of any of aspects 1 to 12, wherein the first set of payload commands comprises a set of draw calls.

Aspect 14 is the method of any of aspects 1 to 13, wherein outputting the third indication of the associated state command comprises: transmitting the third indication of the associated state command; or storing the third indication of the associated state command.

Aspect 15 is the method of aspect 3, further comprising: executing the state command in the payload path.

Aspect 16 is an apparatus for graphics processing including at least one processor coupled to at least one memory, wherein the at least one processor, individually or in any combination, is configured to implement a method as in any of aspects 1 to 15.

Aspect 17 is an apparatus for graphics processing including means for implementing a method as in any of aspects 1 to 15.

Aspect 18 is a computer-readable medium storing computer executable code, the code when executed by at least one processor causes the at least one processor, individually or in any combination, to implement a method as in any of aspects 1 to 15.

Various aspects have been described herein. These and other aspects are within the scope of the following claims.

What is claimed is:

1. An apparatus for graphics processing, comprising:

a memory; and a processor coupled to the memory and, based at least in part on information stored in the memory, the processor is configured to:

obtain a first indication of a first set of payload commands and a second indication of a second set of state commands, wherein the first set of payload commands is associated with a payload path, wherein the second set of state commands is associated with a state path;

determine that a state command in the second set of state commands is associated with a workload that is less than or equal to a workload threshold;

associate the state command with the payload path based on the determination; and output a third indication of the associated state command, wherein, to output the third indication of the associated state command, the processor is configured to:

transmit the third indication of the associated state command; or store the third indication of the associated state command.

2. The apparatus of claim 1, wherein the processor is further configured to: execute the state command in the payload path after the output of the third indication.

3. The apparatus of claim 2, wherein the processor is further configured to:
execute the first set of payload commands in the payload path; and
execute a subset of the second set of state commands in the state path, wherein the subset of the second set of state commands does not include the state command.

4. The apparatus of claim 1, wherein the processor is further configured to:
determine that a portion of the state command is associated with a plurality of state commands of the second set of state commands;
associate the plurality of state commands with the payload path;
associate the portion of the state command with the plurality of state commands; and
output a fourth indication of the association of the portion of the state command with the plurality of state commands.

5. The apparatus of claim 4, wherein the state command comprises a configuration of a common resource associated with the plurality of state commands.

6. The apparatus of claim 4, wherein the processor is further configured to:
determine that a second portion of the state command is not associated with a subset of the plurality of state commands;
determine that a third portion of a second state command of the plurality of state commands is associated with the subset of the plurality of state commands;
associate the third portion of the second state command with the subset of the plurality of state commands; and
output a fifth indication of the association of the third portion of the second state command with the subset of the plurality of state commands.

7. The apparatus of claim 6, wherein the third portion of the second state command comprises a configuration of a common constant buffer.

8. The apparatus of claim 4, wherein, to associate the portion of the state command with the plurality of state commands, the processor is configured to:
merge the portion of the state command and the plurality of state commands into a multi-payload state command associated with the payload path.

9. The apparatus of claim 8, wherein the multi-payload state command comprises a plurality of draw calls.

10. The apparatus of claim 8, wherein the processor is further configured to: execute the multi-payload state command in the payload path after the output of the fourth indication.

11. The apparatus of claim 10, wherein, to execute the multi-payload state command in the payload path, the processor is configured to:
save a fifth indication of the portion of the state command in the payload path; and
execute each of the plurality of state commands using the payload path while the fifth indication is saved in the payload path.

12. The apparatus of claim 4, wherein the portion of the state command comprises a common render state.

13. The apparatus of claim 1, wherein the first set of payload commands comprises a set of draw calls.

14. A method of graphics processing, comprising:
obtaining a first indication of a first set of payload commands and a second indication of a second set of state commands, wherein the first set of payload commands is associated with a payload path, wherein the second set of state commands is associated with a state path;
determining that a state command in the second set of state commands is associated with a workload that is less than a workload threshold;
associating the state command with the payload path based on the determination; and
outputting a third indication of the associated state command, wherein outputting the third indication of the associated state comment comprises:
transmitting the third indication of the associated state command; or
storing the third indication of the associated state command.

15. The method of claim 14, further comprising:
executing the state command in the payload path after the output of the third indication.

16. The method of claim 15, further comprising:
executing the first set of payload commands in the payload path; and
executing a subset of the second set of state commands in the state path, wherein the subset of the second set of state commands does not include the state command.

17. The method of claim 14, further comprising:
determining that a portion of the state command is associated with a plurality of state commands of the first set of state commands;
associating the plurality of state commands with the payload path;
associating the portion of the state command with the plurality of state commands; and
outputting a fourth indication of the association of the portion of the state command with the plurality of state commands.

18. The method of claim 17, further comprising:
determining that a second portion of the state command is not associated with a subset of the plurality of state commands;
determining that a third portion of a second state command of the plurality of state commands is associated with the subset of the plurality of state commands;
associating the third portion of the second state command with the subset of the plurality of state commands; and
outputting a fifth indication of the association of the third portion of the second state command with the subset of the plurality of state commands.

19. The method of claim 17, wherein the state command comprises a configuration of a common resource associated with the plurality of state commands.

20. A computer-readable medium storing computer executable code, the code when executed by a processor, causes the processor to:
obtain a first indication of a first set of payload commands and a second indication of a second set of state commands, wherein the first set of payload commands is associated with a payload path, wherein the second set of state commands is associated with a state path;
determine that a state command in the second set of state commands is associated with a workload that is less than a workload threshold;
associate the state command with the payload path based on the determination; and output a third indication of the associated state command, wherein, to output the third indication of the associated state command, the code when executed by the processor, causes the processor to:

transmit the third indication of the associated state command; or store the third indication of the associated state command.

* * * * *